(12) United States Patent
Miller

(10) Patent No.: US 8,702,103 B2
(45) Date of Patent: Apr. 22, 2014

(54) APPARATUS, METHOD, AND SYSTEM FOR CARD GAME WITH DIAGRAMMATIC SOLUTIONS FOR PLAY OUTCOMES

(76) Inventor: David Miller, Dallas, TX (US)

( * ) Notice: Subject to any disclaimer, the term of this patent is extended or adjusted under 35 U.S.C. 154(b) by 11 days.

(21) Appl. No.: 13/563,409

(22) Filed: Jul. 31, 2012

(65) Prior Publication Data

US 2014/0035230 A1 Feb. 6, 2014

(51) Int. Cl.
*A63F 1/00* (2006.01)

(52) U.S. Cl.
USPC ............................................... 273/298

(58) Field of Classification Search
None
See application file for complete search history.

(56) References Cited

U.S. PATENT DOCUMENTS

| | | | | |
|---|---|---|---|---|
| 4,822,043 A * | 4/1989 | Carter | | 273/298 |
| 5,026,058 A * | 6/1991 | Bromley | | 463/3 |
| 5,158,301 A * | 10/1992 | Martukovich, Jr. | | 273/247 |
| 5,411,259 A * | 5/1995 | Pearson et al. | | 463/36 |
| 5,533,124 A * | 7/1996 | Smith et al. | | 705/57 |
| 5,689,561 A * | 11/1997 | Pace | | 705/55 |
| 5,743,801 A * | 4/1998 | Welander | | 463/44 |
| 5,862,332 A * | 1/1999 | Sakuraba et al. | | 709/219 |
| 6,061,656 A * | 5/2000 | Pace | | 705/14.1 |
| 6,612,501 B1 * | 9/2003 | Woll et al. | | 235/494 |
| 7,980,933 B2 * | 7/2011 | Kennedy | | 463/12 |
| 8,292,714 B2 * | 10/2012 | Kennedy | | 463/12 |

\* cited by examiner

*Primary Examiner* — Kurt Fernstrom
*Assistant Examiner* — Dolores Collins
(74) *Attorney, Agent, or Firm* — Locke Lord LLP

(57) ABSTRACT

The present invention is directed to an apparatus, method, and system for playing a sports card game that features graphical, diagrammatic solutions for play outcomes. The preferred embodiment is directed to a representation of an American football game and consists of a deck of cards, half of which are offense cards, and half of which are defense cards. Offensive cards feature a play line while each defensive card features multiple possible play paths and a corresponding number of possible play outcomes. The method for playing the game involves the players picking cards and then flipping over their cards and aligning their edges at which point the play line on the offense card will line up with one of the possible play paths and outcomes on the defense card. An electronic version of the present invention is also disclosed.

18 Claims, 31 Drawing Sheets

FIG. 20

KICK-OFF
Kicking-Team Rolls Dice
THREE DICE

Yard-Line Location of New Line-of-Scrimmage
(Always Located on the Receiving-Team Side of Field)
Net After the Return

LOCATION OF NEW LOS OF RECEIVING TEAM

| DICE ROLL | NORMAL | AFTER SAFETY | ON-SIDE |
|---|---|---|---|
| 3 | Return / TD | Return / TD | Return / TD |
| 4 | 45 | 48 | Return / TD |
| 5 | 40 | 46 | 50 |
| 6 | 35 | 44 | 50 |
| 7 | 30 | 42 | 49 |
| 8 | 25 | 40 | 49 |
| 9 | 20 | 38 | 48 |
| 10 | 20 | 36 | 48 |
| 11 | 20 | 34 | 47 |
| 12 | 20 | 32 | 47 |
| 13 | 20 | 30 | 46 |
| 14 | 15 | 28 | 42 |
| 15 | 10 | 26 | 42 |
| 16 | 5 | 24 | 42 |
| 17 | 2 | 22 | Fumble / 50 |
| 18 | Fumble / 20 | Fumble / 30 | Fumble / 45 |

HIGHER ROLLS ARE BETTER FOR THE KICKING TEAM

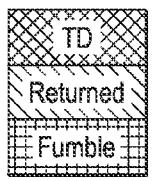

TD < Returned by Receiving-Team for TD
Returned < Receiving-Team takes over
Fumble < Recovered by Kicking-Team LOS = Line of Scrimmage

PUNT
Kicking-Team Rolls Dice
THREE DICE

Distance to the New Line-of-Scrimmage
(Measured from the Current Line-of-Scrimmage)
Net After the Return

| DICE ROLL | DISTANCE FROM CURRENT TO NEW LOS | |
|---|---|---|
| | NORMAL | POOCH |
| 3 | Return / TD | Block / -5 |
| 4 | Block / -10 | 20 |
| 5 | 26 | 22 |
| 6 | 31 | 23 |
| 7 | 34 | 24 |
| 8 | 35 | 25 |
| 9 | 36 | 26 |
| 10 | 37 | 27 |
| 11 | 38 | 28 |
| 12 | 39 | 29 |
| 13 | 40 | 30 |
| 14 | 41 | 31 |
| 15 | 42 | 32 |
| 16 | 45 | 33 |
| 17 | 50 | 35 |
| 18 | Fumble / 37 | Fumble / 27 |

HIGHER ROLLS ARE BETTER FOR THE KICKING TEAM

- TD < Returned by Receiving-Team for TD
- Blocked! < Blocked and recovered by Receiving-Team
- Returned < Receiving-Team takes over
- Fumble < Recovered by Kicking-Team LOS = Line of Scrimmage

FIG. 22

FIELD GOAL
Kicking-Team Rolls Dice
THREE DICE

Distance to the New Line-of-Scrimmage if No Good
(Measured from the Current Line-of-Scrimmage)

CURRENT LOS OF THE KICKING TEAM

| DICE ROLL | LOS ON 1-9 | LOS ON 10-19 | LOS ON 20-29 | LOS ON 30-39 | LOS ON 40-49 |
|---|---|---|---|---|---|
| 3 | Miss / -8 | Miss / -8 | Miss / -8 | Block / -20 | Block / TD |
| 4 | Miss / -8 | Miss / -8 | Miss / -8 | Miss / -8 | Block / -15 |
| 5 | | Miss / -8 | Miss / -8 | Miss / -8 | Miss / -8 |
| 6 | | Miss / -8 | Miss / -8 | Miss / -8 | Miss / -8 |
| 7 | | | Miss / -8 | Miss / -8 | Miss / -8 |
| 8 | | | Miss / -8 | Miss / -8 | Miss / -8 |
| 9 | | | | Miss / -8 | Miss / -8 |
| 10 | | | | | Miss / -8 |
| 11 | | | | | Miss / -8 |
| 12 | | | | | |
| 13 | | | | | |
| 14 | | | | | |
| 15 | | | | | |
| 16 | | | | | |
| 17 | | | | | |
| 18 | | | | | |

HIGHER ROLLS ARE BETTER FOR THE KICKING TEAM

- Blocked/TD! < Blocked and returned by Defense for TD
- Blocked! < Blocked/recovered by Defense (yards behind LOS)
- Missed < Defense takes over (eight yards behind LOS)
- Good! < Kick is good for three points LOS = Line of Scrimmage Ball is spotted eight yards behind LOS for the kick

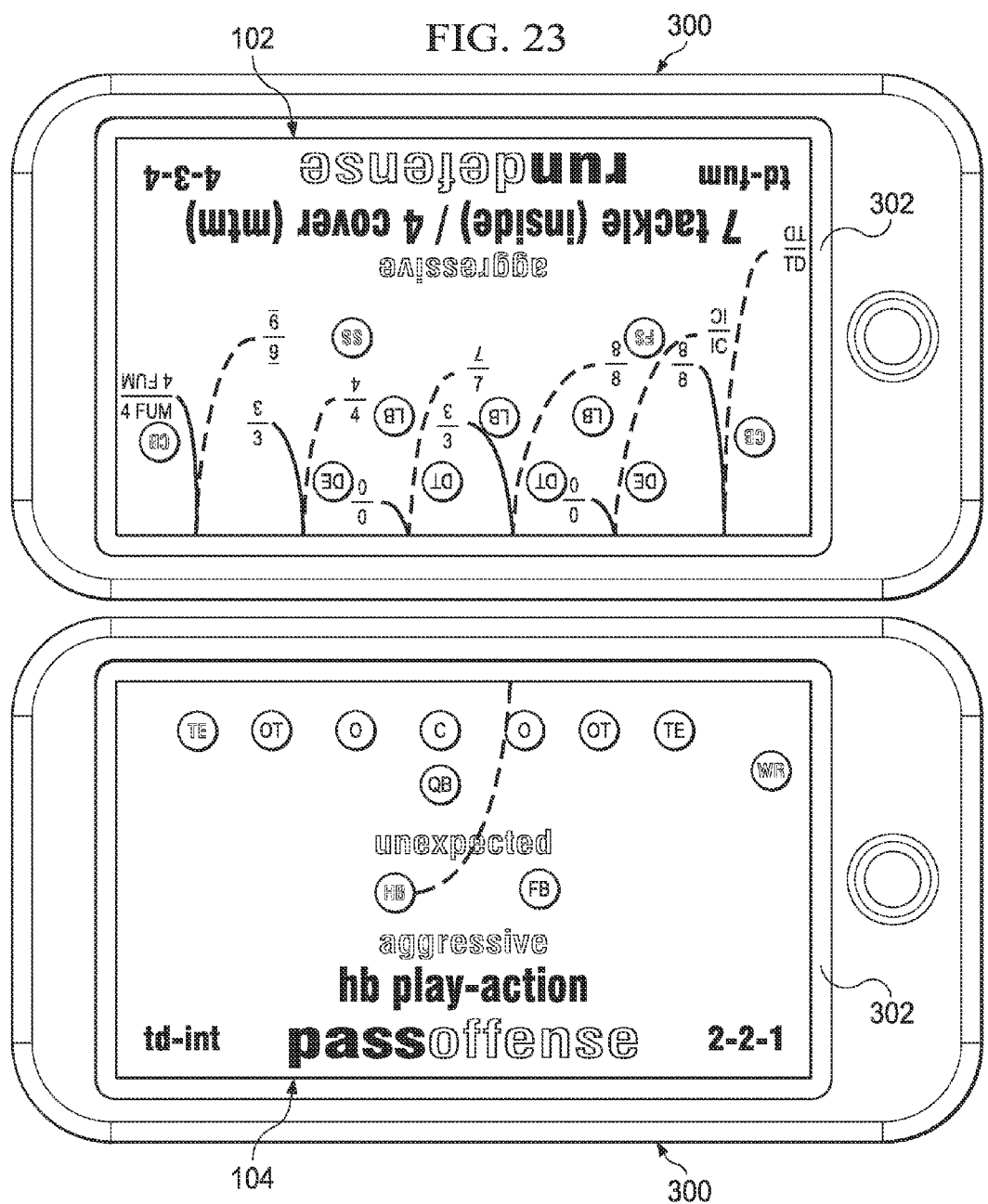

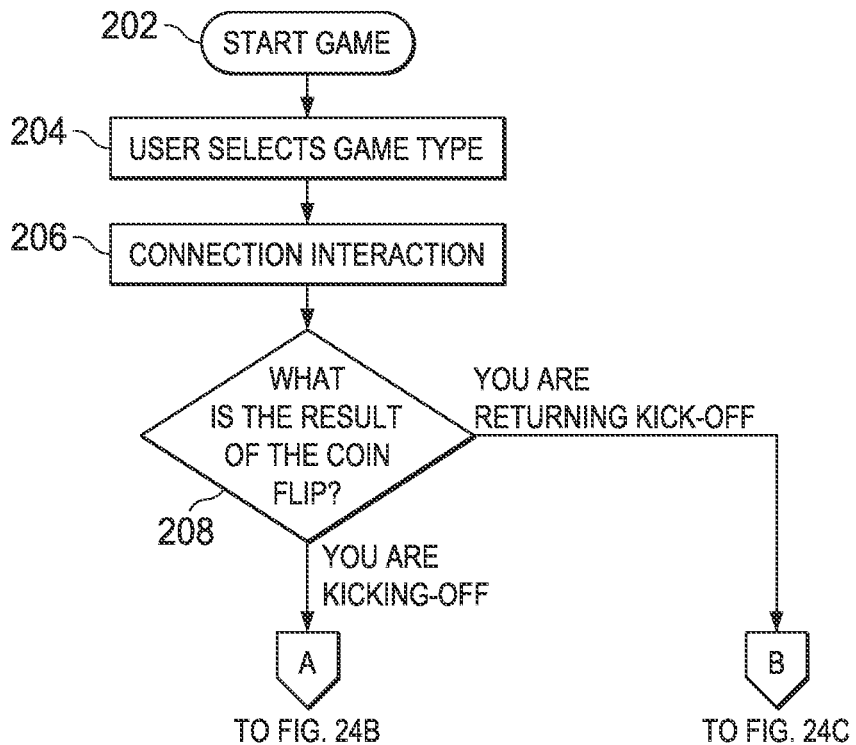

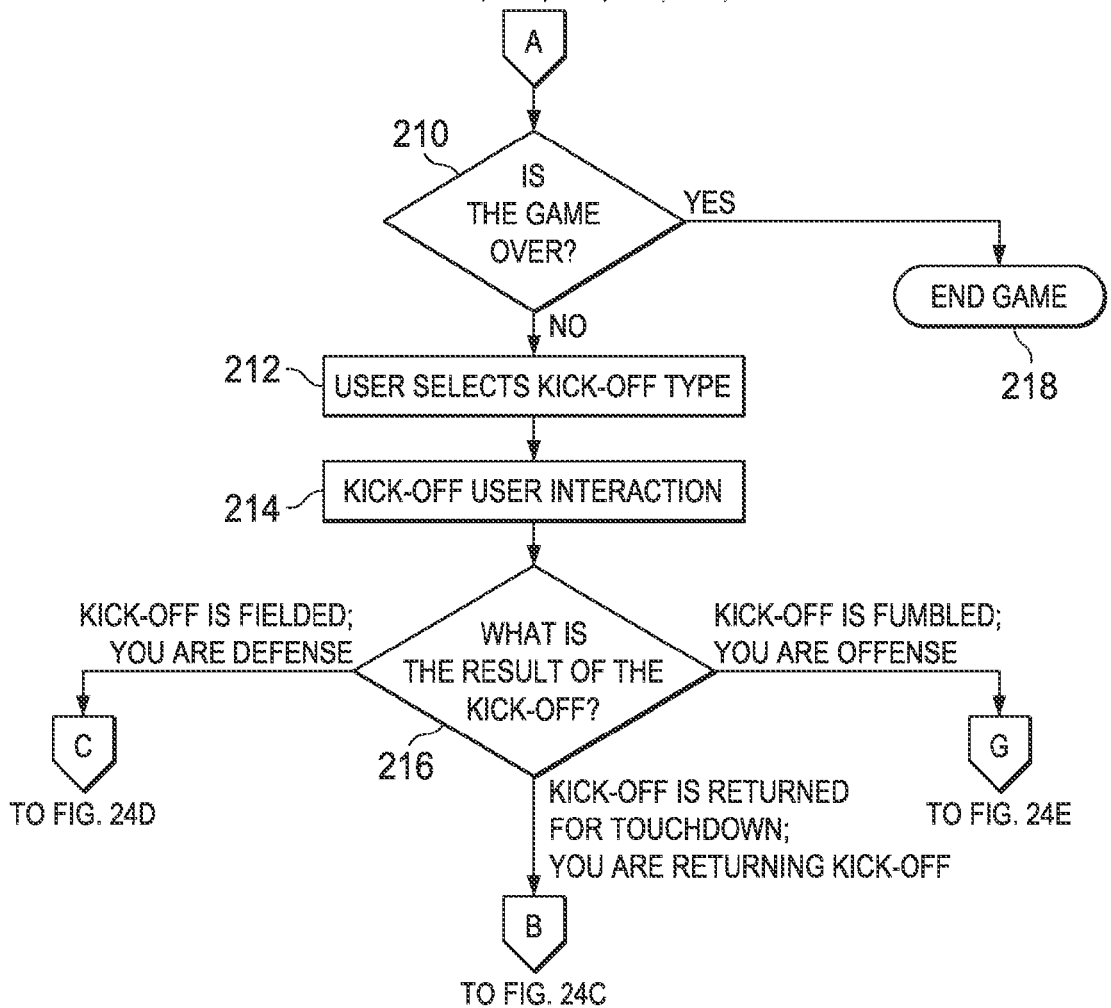

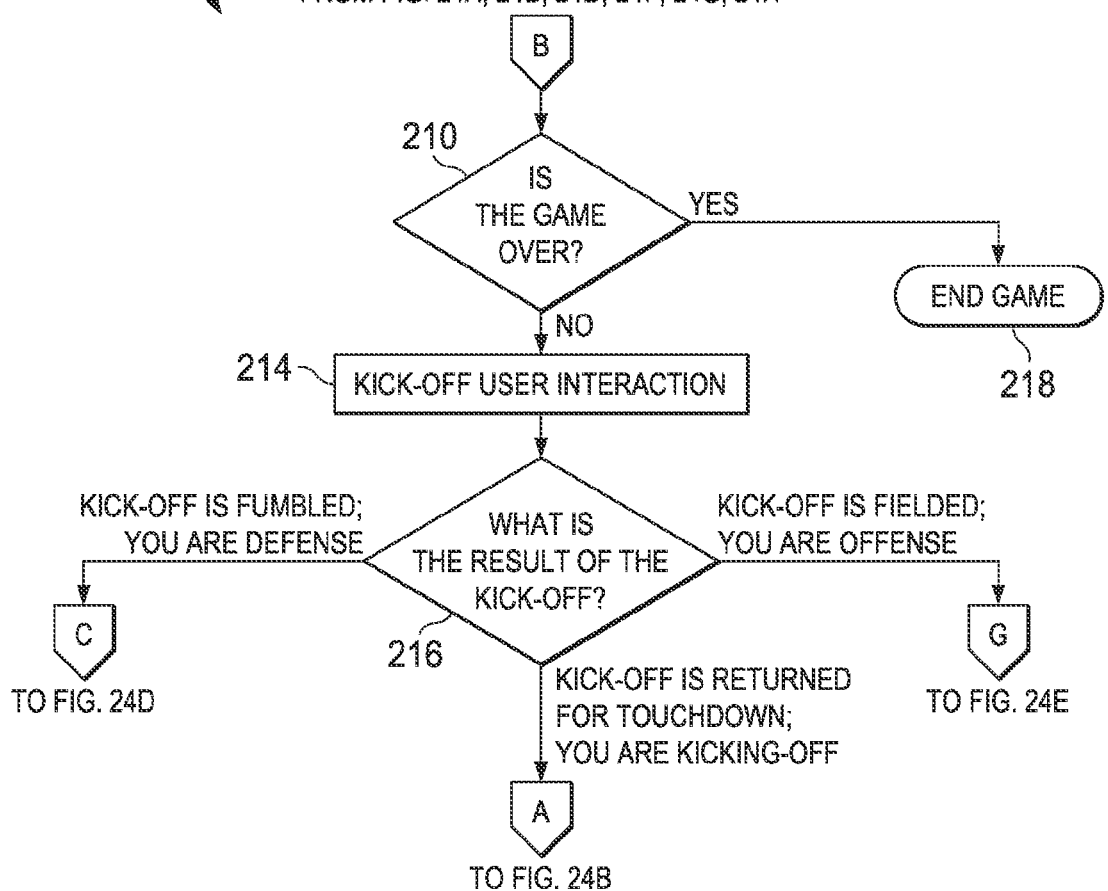

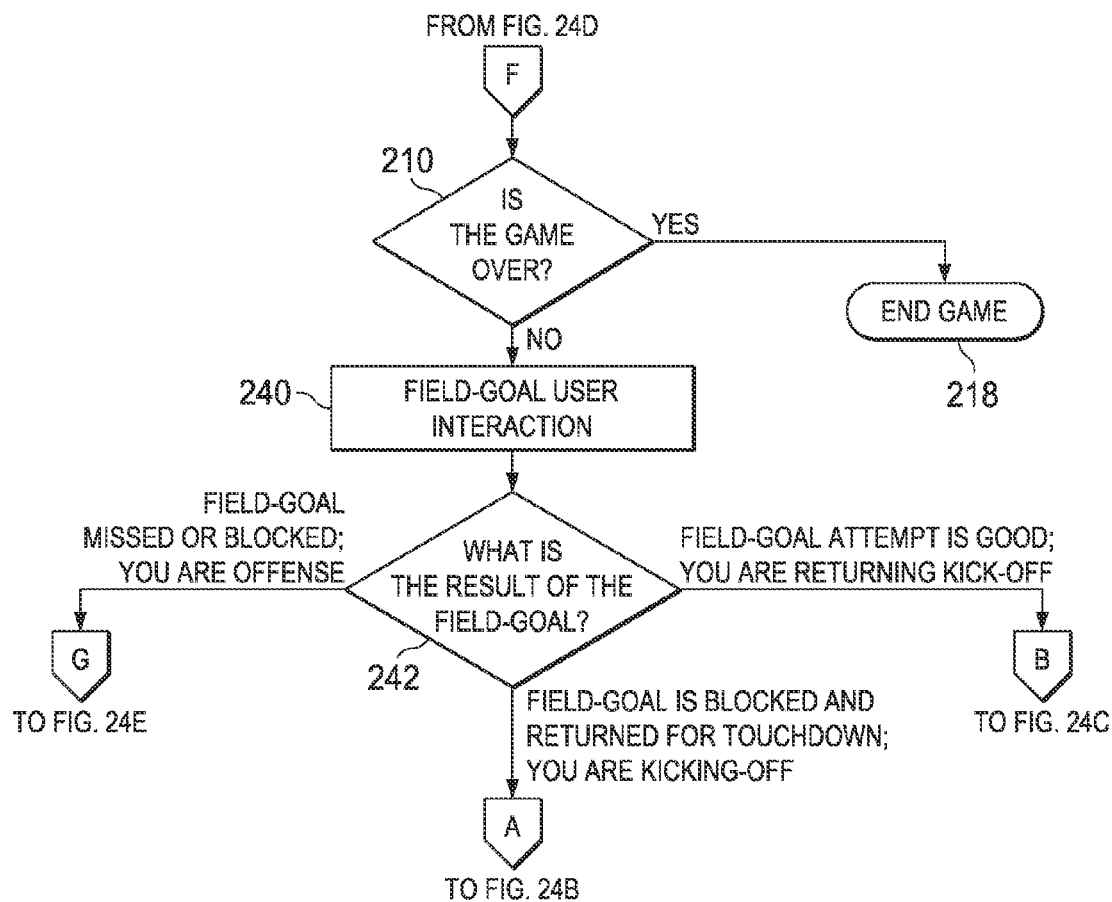

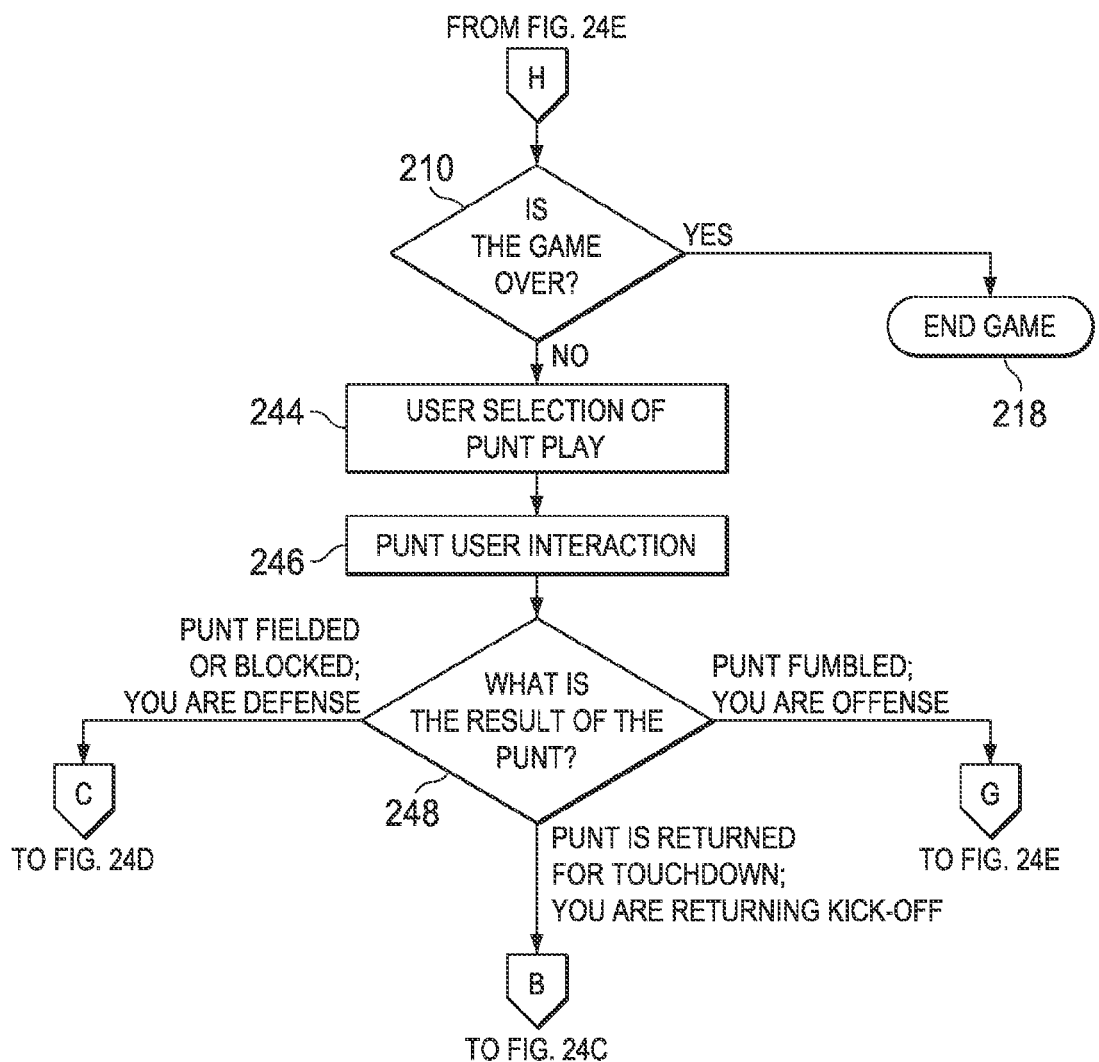

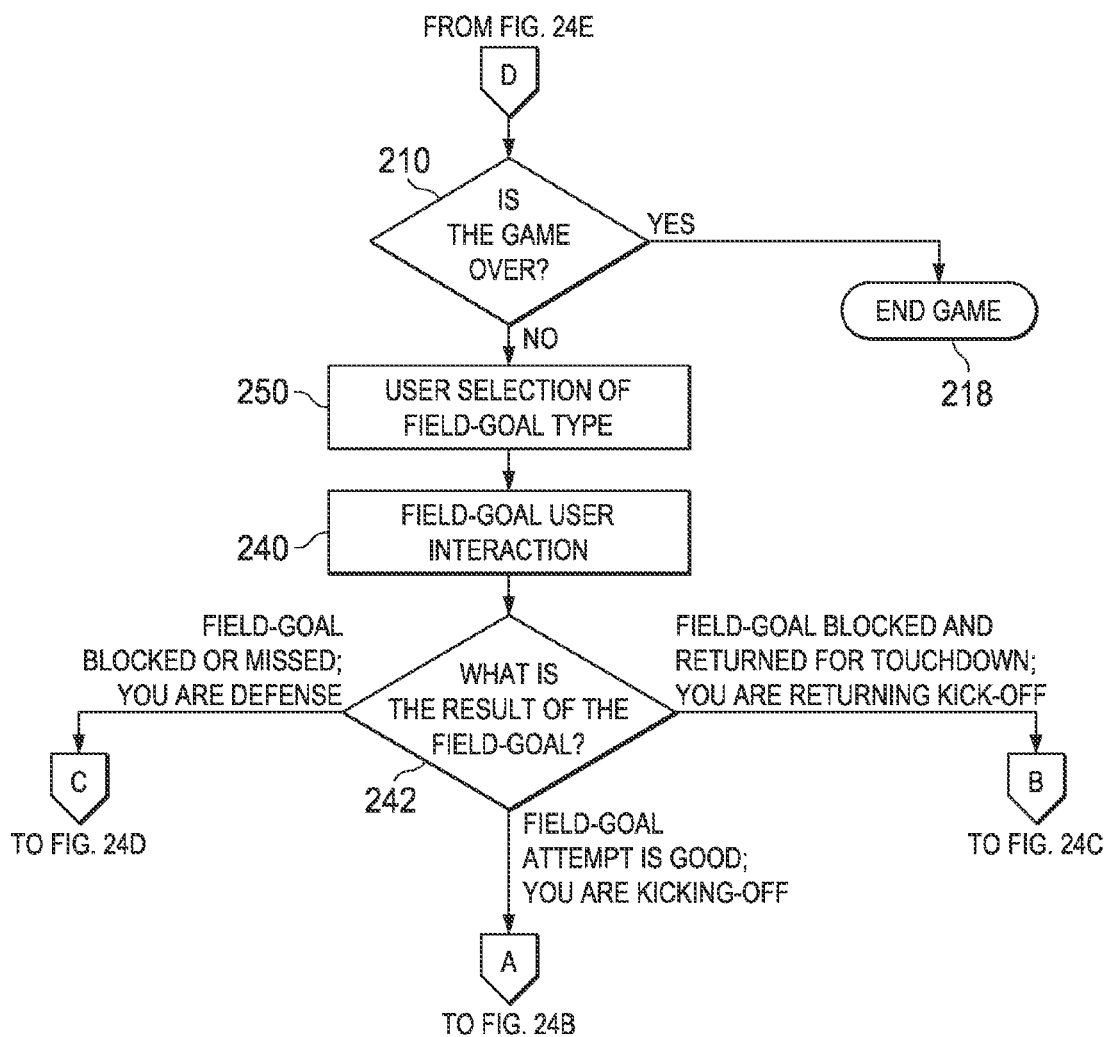

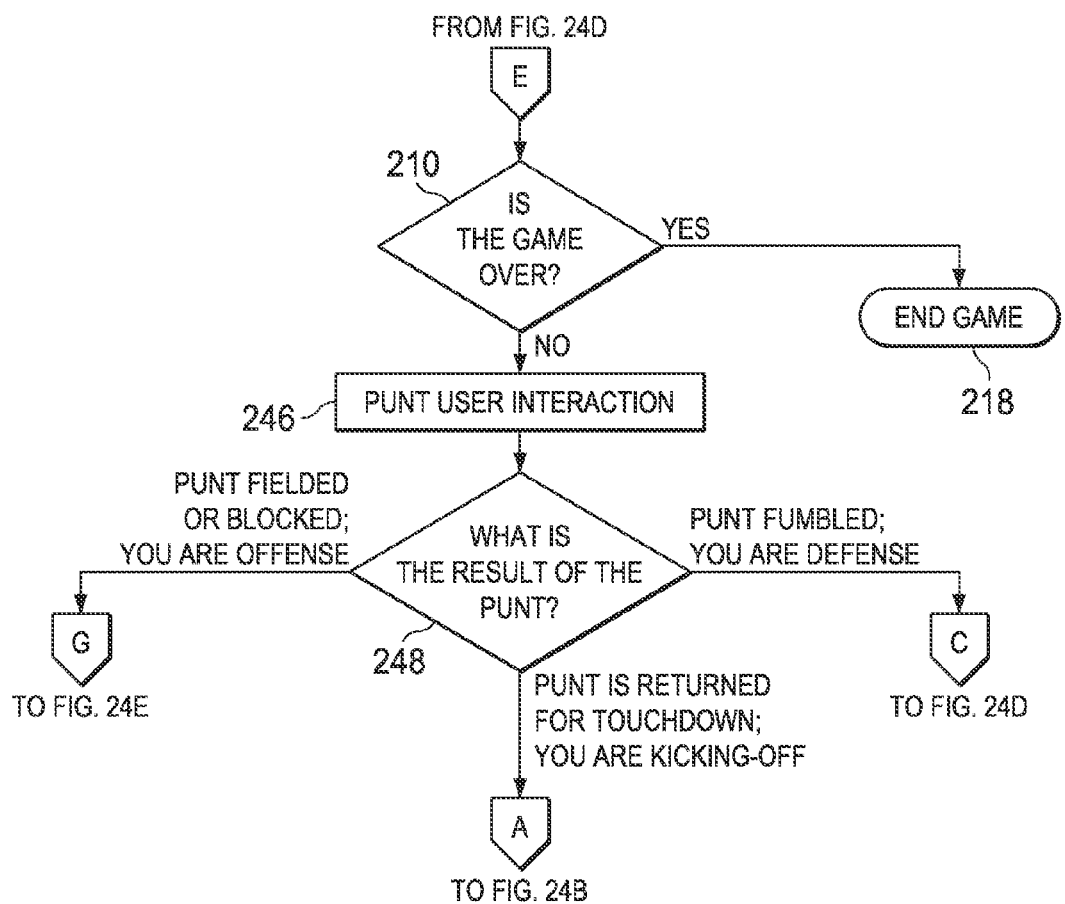

APPARATUS, METHOD, AND SYSTEM FOR CARD GAME WITH DIAGRAMMATIC SOLUTIONS FOR PLAY OUTCOMES

BACKGROUND OF THE INVENTION

1. Field of Invention

The present invention is directed to an apparatus, method, and system for playing a card game that features diagrammatic, single-step solutions for play outcomes.

2. Description of Related Art

Football card or board games are known and include the following: Card Football Premier Edition; Jukem Football Card Game; Action Mat Football; Card Bowl; Topps Attax Football; Pizza Box Football; PayDirt Football; Football Strategy; Strat-o-Matic; Statis Pro Football; APBA Pro Football; Big Sunday Football; Inside Blitz Football; Football Frenzy; 1st and Goal; and Playbook Football.

However, these other games often rely on one or more tables separate from the playing cards or board to determine game statistics and play outcome solutions. They also often require dice or conventional card dynamics, such as card retirement, drawing, or shuffling. Moreover, multiple game play steps are often required to determine the outcome of a single play. This results in a game that can be complicated, time-consuming, and confusing, especially for younger or inexperienced players, and in turn this results in decreased entertainment and enjoyment. Thus, a need exists in the art for a game with a simple, single-step, and preferably visual solution to determine play outcomes.

SUMMARY

The present invention is directed to an apparatus, method, and system for playing a card game that features diagrammatic, single-step solutions for play outcomes. A preferred embodiment is directed to a representation of an American football game but can be adapted to other games. The apparatus comprises a deck of cards, half of which are offense cards, and half of which are defense cards. Each offensive card features a single play line while each defensive card features multiple possible play paths and a corresponding number of possible play outcomes. Of those possible play paths and outcomes, half are running plays, and half are passing plays. In a preferred embodiment, the cards feature depictions of player positions and player packages.

The method comprises numerous steps, including the selection by an offensive player of an offense card. The defensive player picks a defense card. The players then flip over their cards and align their edges at which point the play line on the offense card will line up with one of the possible play paths and outcomes on the defense card. The play outcome is recorded or noted with respect to both downs and yard distance. The preferred embodiment can also feature disclosures of player packages, alternate play choices based on player package disclosures, unexpected plays based on player packages, and play risk indications.

The system of the present invention comprises the use of multiple electronic devices to play the novel card game of this invention.

BRIEF DESCRIPTION OF THE DRAWINGS

The apparatus, method, and system of the invention is further described and explained in relation to the following figures of the drawing wherein:

FIG. 20 is a top elevation view of an optional kick-off table of a preferred embodiment;

FIG. 21 is a top elevation view of an optional punt table of a preferred embodiment;

FIG. 22 is a top elevation view of an optional field goal table of a preferred embodiment;

FIG. 23 is a top elevation view of a preferred embodiment where the card game is played on two mobile devices;

FIG. 24A depicts processing logic for a starting game sequence of a preferred embodiment for an electronic version of the card game;

FIG. 24B depicts processing logic for a kicking-off sequence of a preferred embodiment for an electronic version of the card game;

FIG. 24C depicts processing logic for a returning kick-off sequence of a preferred embodiment for an electronic version of the card game;

FIG. 24F depicts processing logic for a defending field-goal sequence of a preferred embodiment for an electronic version of the card game;

FIG. 24G depicts processing logic for a kicking punt sequence of a preferred embodiment for an electronic version of the card game;

FIG. 24H depicts processing logic for a kicking field-goal sequence of a preferred embodiment for an electronic version of the card game; and FIG. 24I depicts processing logic for a returning punt sequence of a preferred embodiment for an electronic version of the card game.

DETAILED DESCRIPTION OF THE PREFERRED EMBODIMENTS

Card Design and Diagrammatic Solutions

Figure 1:
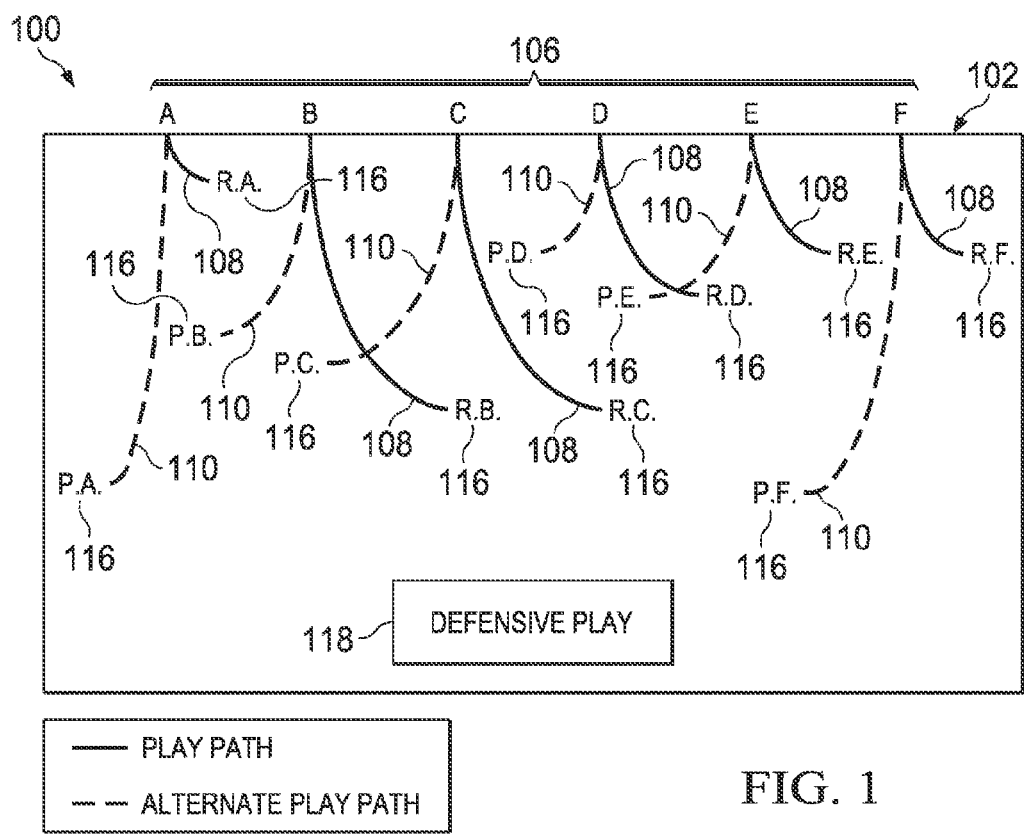
FIG. 1 is a top elevation view of the face of a defense card with multiple play paths and outcomes.

As shown in FIGS. 1-19, the apparatus of the invention comprises card game 100 that includes a deck of cards, half of which are defense cards 102, and half of which are offense cards 104. As shown in FIGS. 1-6, each defense card 102 and each offense card 106 has six lanes 106 that are designated by the letters A-F. As shown in FIGS. 7-18, when the top edge of a defense card 102 and the top edge of an offense card 104 are placed adjacent to one another, the six lanes 106 on each card align such that each lettered lane of a defense card 102 lines up with the corresponding lettered lane of an offense card 104. That is, lane A on defense card 102 will face and line up with lane A on offense card 104 while lane B on defense card 102 will face and line up with lane B on offense card 104, and so on for each lane through lane F. The card game 100 can also comprise more or less than six lanes.

As shown in FIG. 1, a defense card 102 features one play path 108 and one alternate play path 110 in each lane 106. At the end of each play path 108 or alternate play path 110 is a unique play outcome 116. In FIG. 1, the play outcomes 116 at the end of play paths 108 are depicted by the letter "R" and the letter of the lane 106. For example, at the end of play path 108 in lane A is the play outcome 116 with the label "R.A." Likewise, play outcome 116 at the end of play path 108 in lane B is labeled "R.B.," and so on for each lane through lane F. As also shown in FIG. 1, the play outcomes 116 at the end of alternate play paths 110 are depicted by the letter "P" and the letter of the lane 106. For example, at the end of alternate play path 110 in lane A is the play outcome 116 with the label "P.A." Likewise, play outcome 116 at the end of alternate play path 110 in lane B is labeled "P.B.," and so on for each lane through lane F. The cards can be made of standard card materials (e.g., paper or plastic) or can exist in an electronic format. A defense card 102 also desirably features a defensive play indicator 118.

Figure 2:
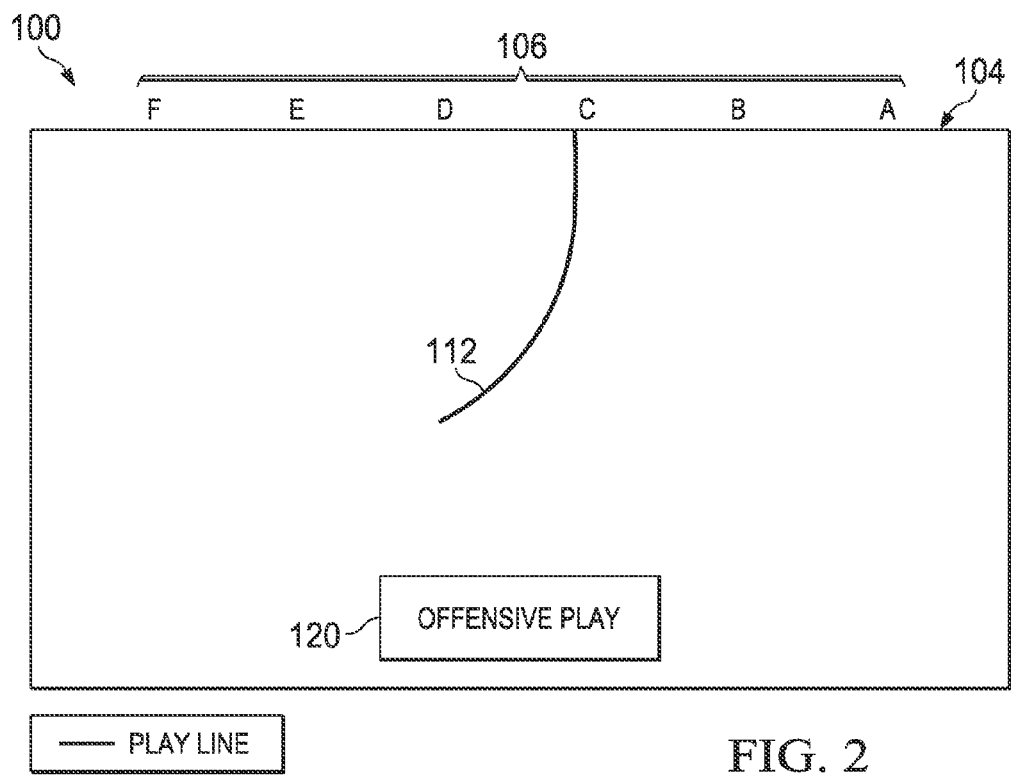
FIG. 2 is a top elevation view of the face of an offense card with a single play line.
Figure 3:
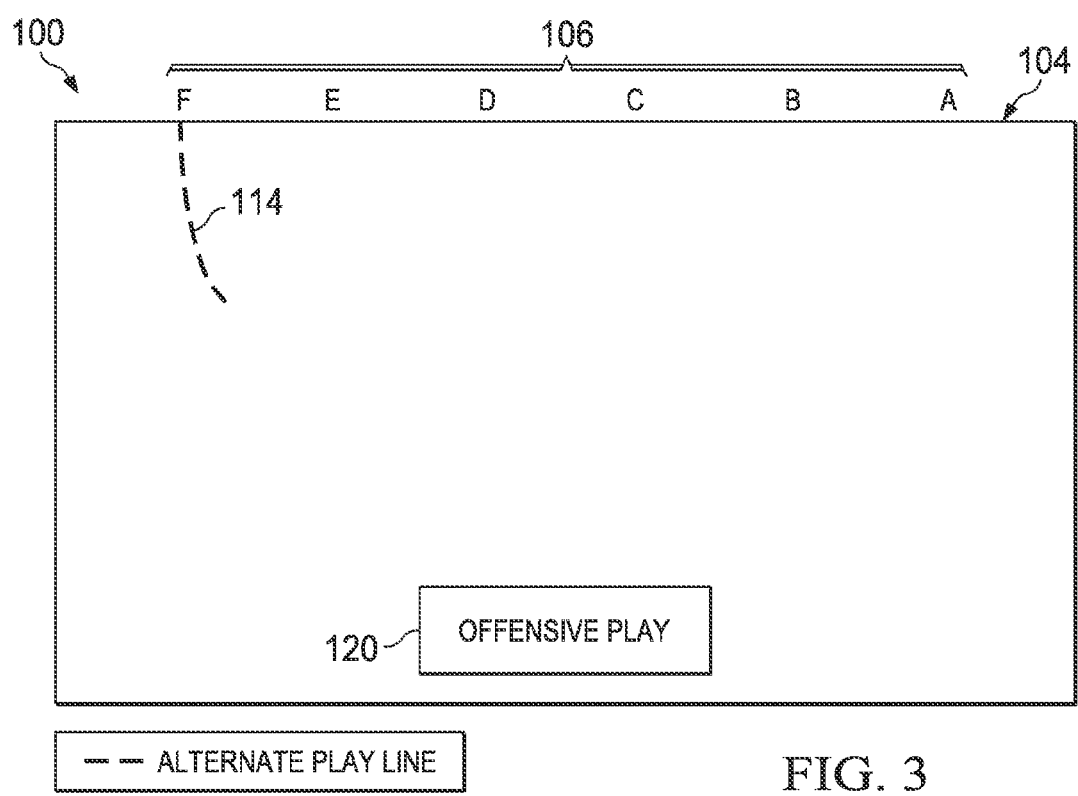
FIG. 3 is a top elevation view of the face of an offense card with a single alternate play line.

As shown in FIG. 2, an offense card 104 features one play line 112 that is in only one lane 106. As shown in FIG. 3, an offense card 104 can instead feature one alternate play line 114 that is also only in one lane 106. Play paths 108 and play lines 112 are both shown using the same style or color line as each other while alternate play paths 110 and alternate play lines 114 are both shown using the same style or color line as each other. An offense card 104 also desirably features an offensive play indicator 120.

As described above, when the top edges of a defense card 102 and an offense card 104 are aligned, lanes A-F are aligned. Additionally, a play line 112 of an offense card 104 will align with the corresponding play path 108 of defense card 102 in the lane 106 in which play line 112 is situated. For example, as shown in FIGS. 1 and 2, if play line 112 of offense card 104 is in lane C, it will align with play path 108 of defense card 102 that is in lane C. The play outcome 116 in that scenario would be "R.C." However, if offense card 104 featured an alternate play line 114, it will align with the corresponding alternate play path 110 of defense card 102 in the lane 106 in which alternate play line 114 is situated. For example, as shown in FIGS. 1 and 3, if alternate play line 114 is in lane F, it will align with alternate play path 110 of defense card 102 that is in lane F. The play outcome 116 in that scenario would be "P.F."

Figure 4:
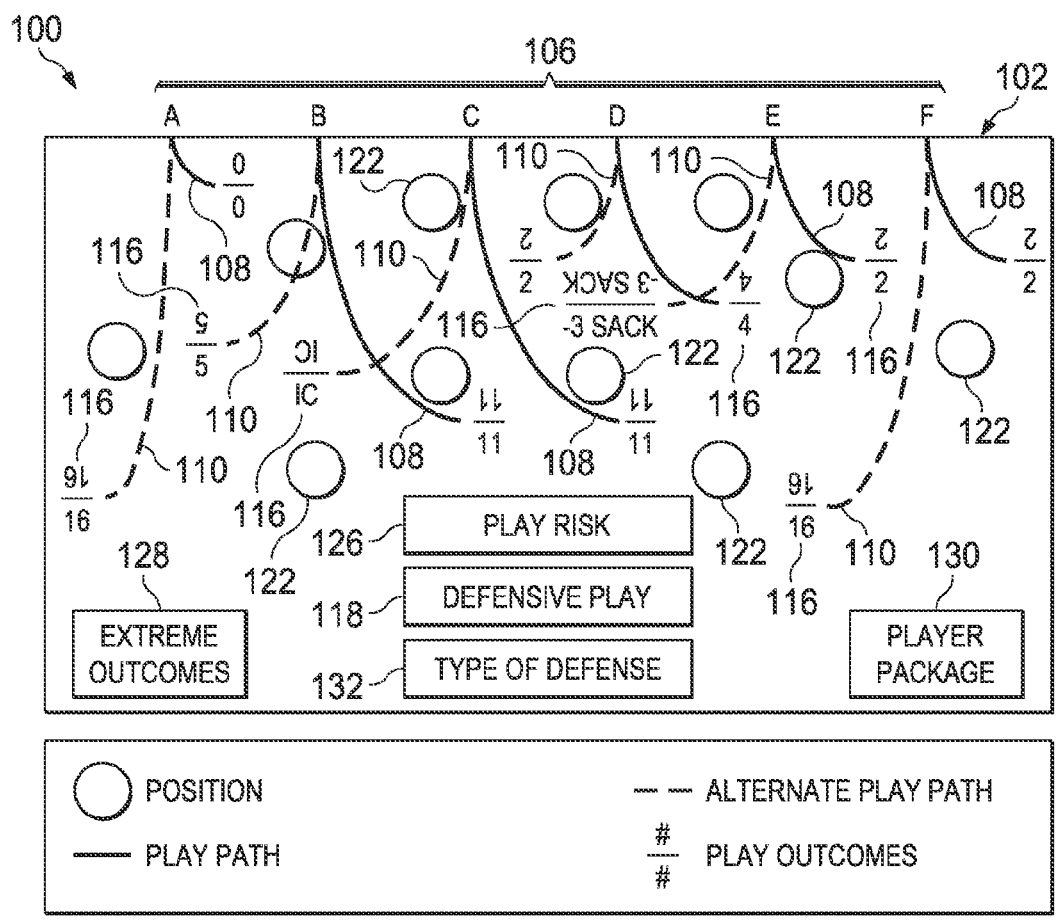
FIG. 4 is a top elevation view of the face of a defense card with multiple play paths and outcomes, player positions, and additional details about the play.

As shown in FIGS. 4 and 7-18, a defense card 102 can desirably include additional details. For example, as shown in FIG. 4, defense card 102 can include defensive player positions 122, a play risk indicator 126, an extreme outcome indicator 128, a player package indicator 130, and a defense type indicator 132. In a preferred embodiment for a football card game, defense card 102 can include 11 defensive player positions 122 to represent the 11 defensive players on the field for a football team. Additionally, as shown in FIGS. 7-18, defensive player positions 122 can be labeled with a defensive position, such as "CB" for cornerback or "FS" for free safety. Player package indicator 130 indicates the formation and alignment of the defensive players, such as "3-4-4," "4-3-4," or "3-3-5," which indicate the number of lineman, linebackers, and defensive backs, respectively.

Extreme outcomes indicator 128 provides information on the most extreme, or worst and best case, scenarios for play outcomes 116 for that particular defense card 102. For example, in FIG. 7, extreme outcome indicator 128 conveys that a touchdown ("TD") is the worst case scenario and an interception ("INT") is the best case scenario for the defense when playing that defense card 102. As another example, in FIG. 9, extreme outcome indicator 128 conveys that a sack ("SACK") is the best case scenario for the defense when playing that defense card 102. As shown in FIGS. 4 and 7-18, in a preferred embodiment for a football game, play outcomes 116 can be depicted numerically to represent the number of yards gained on a play or can be depicted with abbreviations for play events. As shown in FIGS. 7-18, for example, abbreviations can include "IC" for incomplete pass, "10 INT" for a 10-yard pass that is intercepted with no return, "−1 TFL" for a 1-yard loss after a tackle, "TD" for touchdown, "−3 SACK" for a 3-yard loss after a sack, or "3 FUM" for a 3-yard gain that is fumbled with no return. Optionally, as shown in FIGS. 4 and 7-18, play outcomes 116 can be written in dual orientations so that any given play outcome 116 can be read from either player's perspective.

Figure 11:
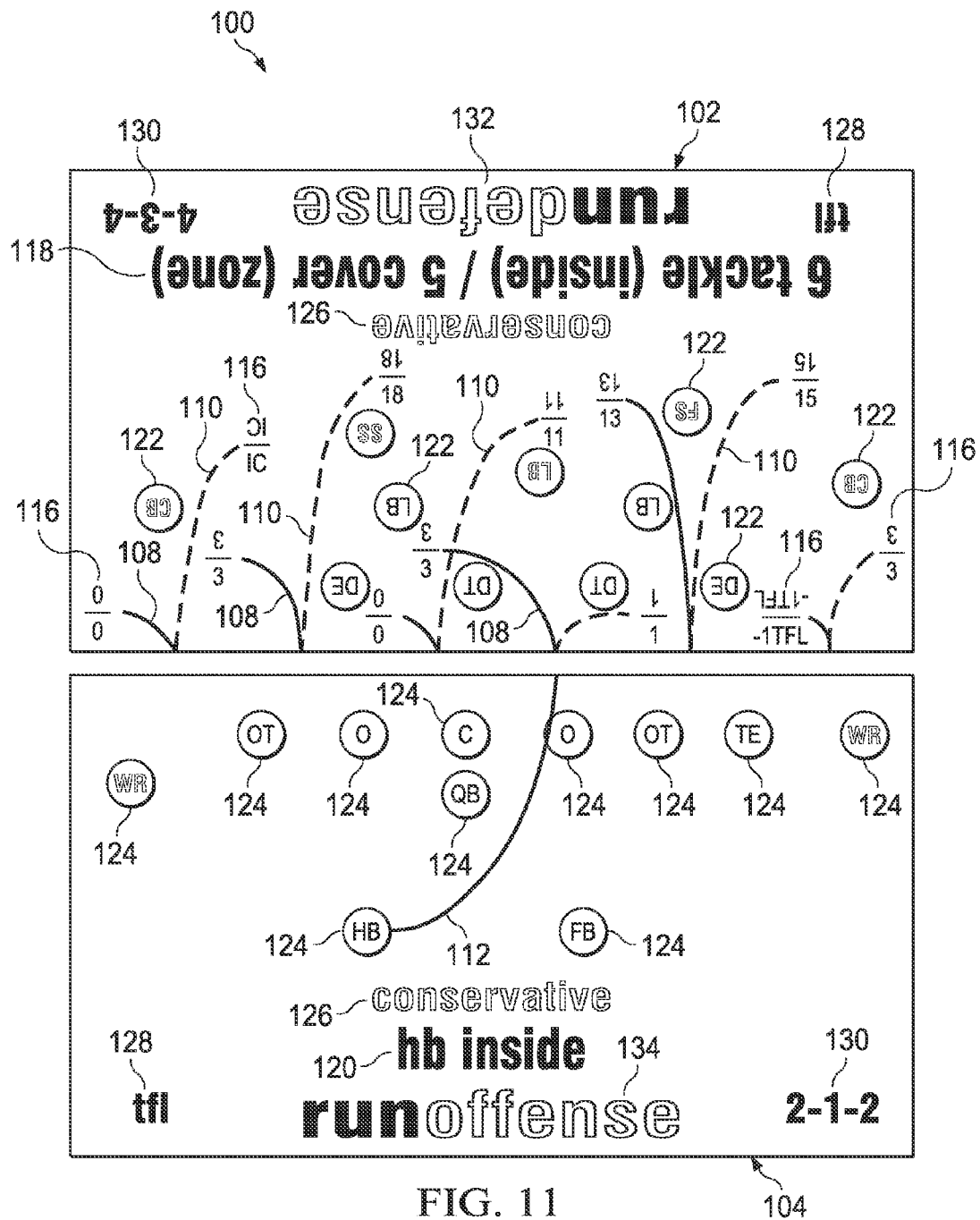
Figure 12:
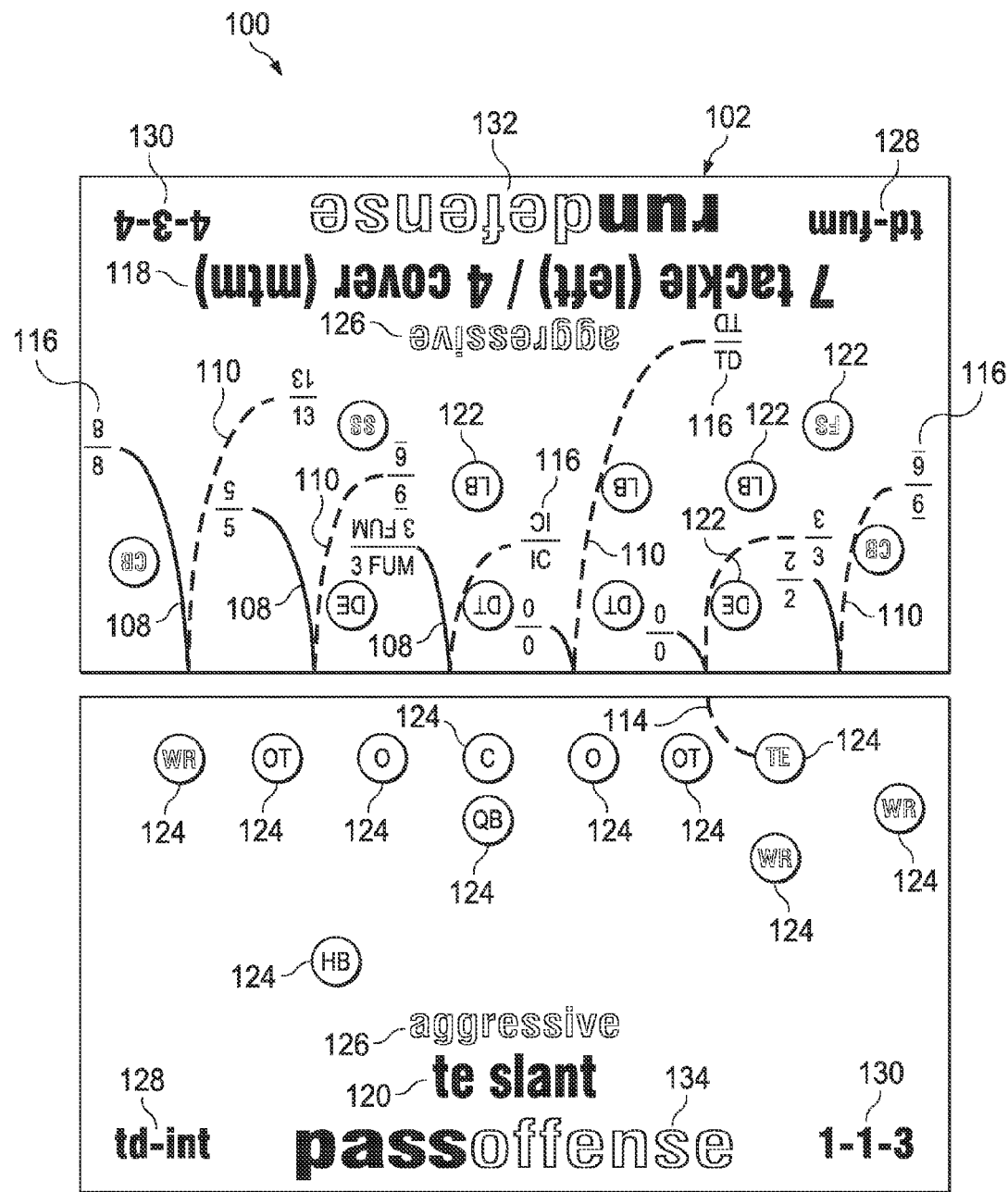
Figure 13:
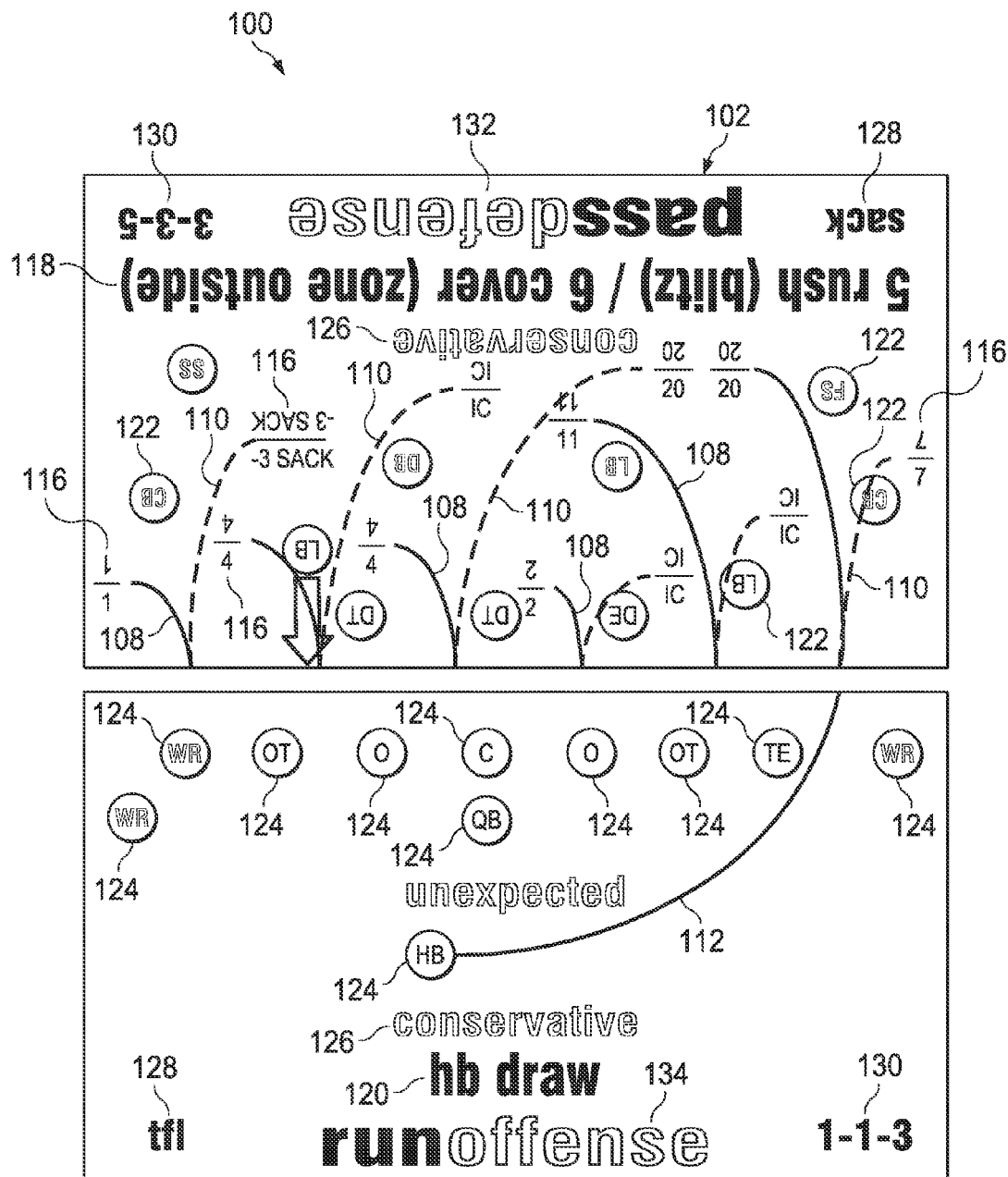
Figure 14:
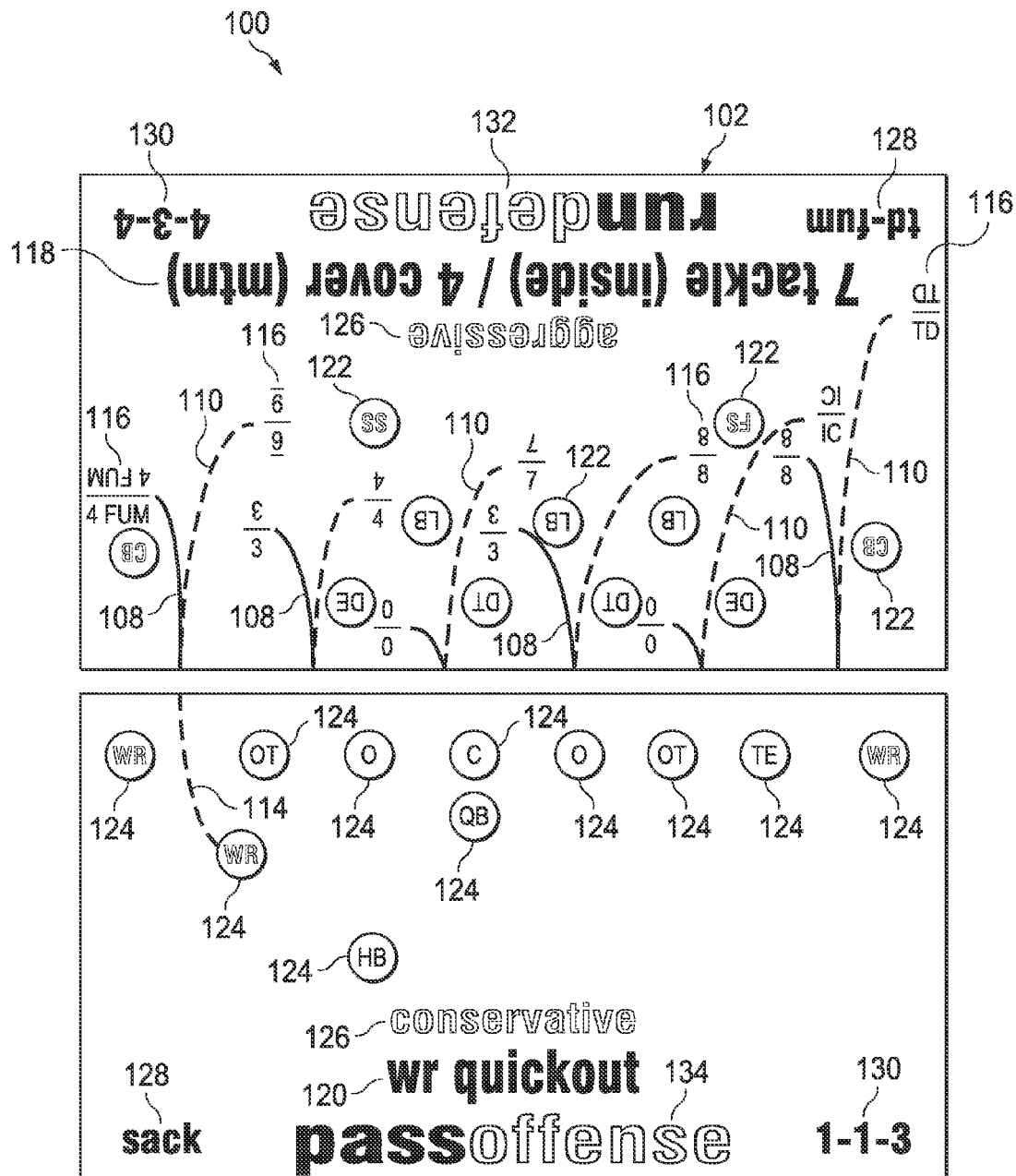
Figure 15:
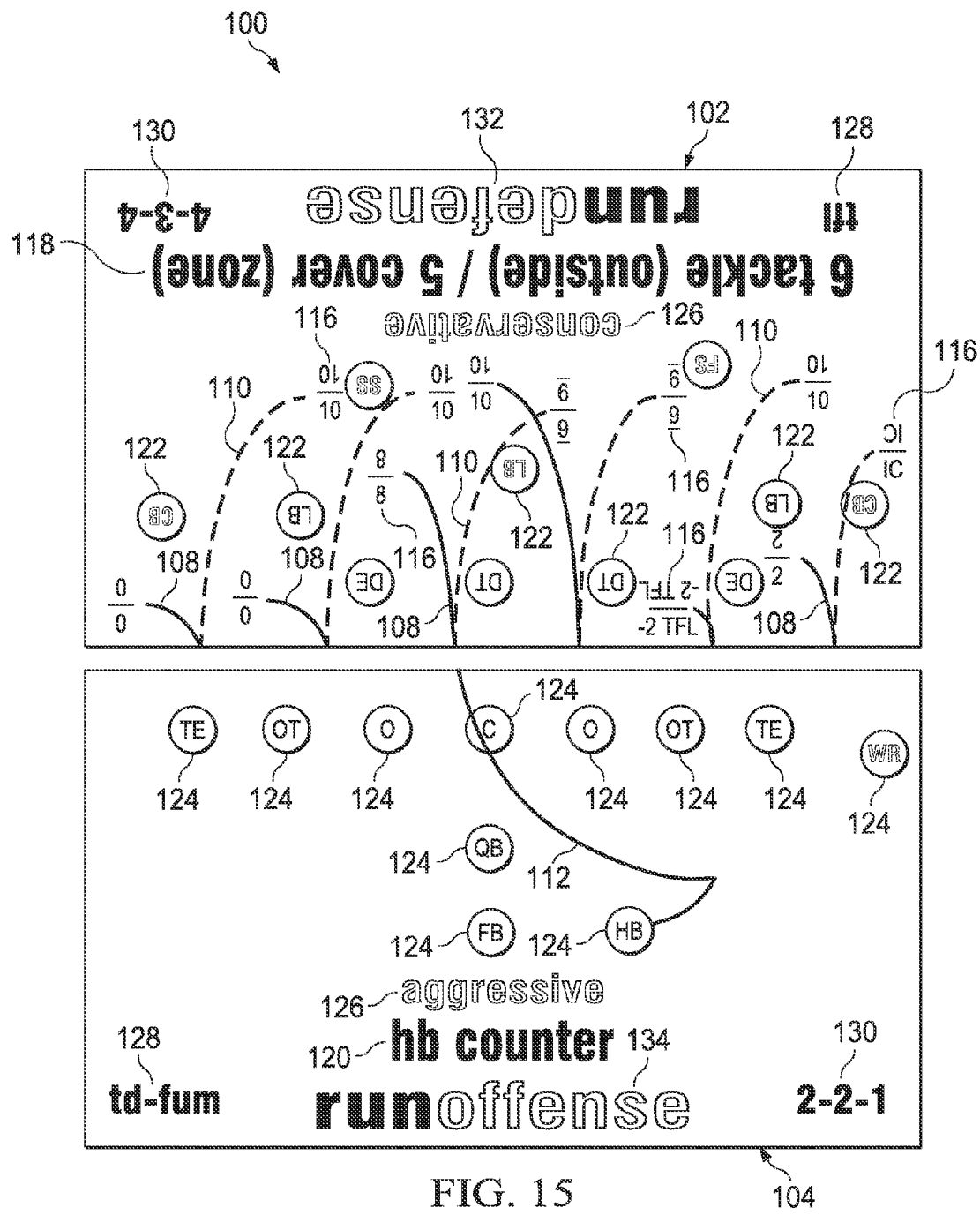
Figure 16:
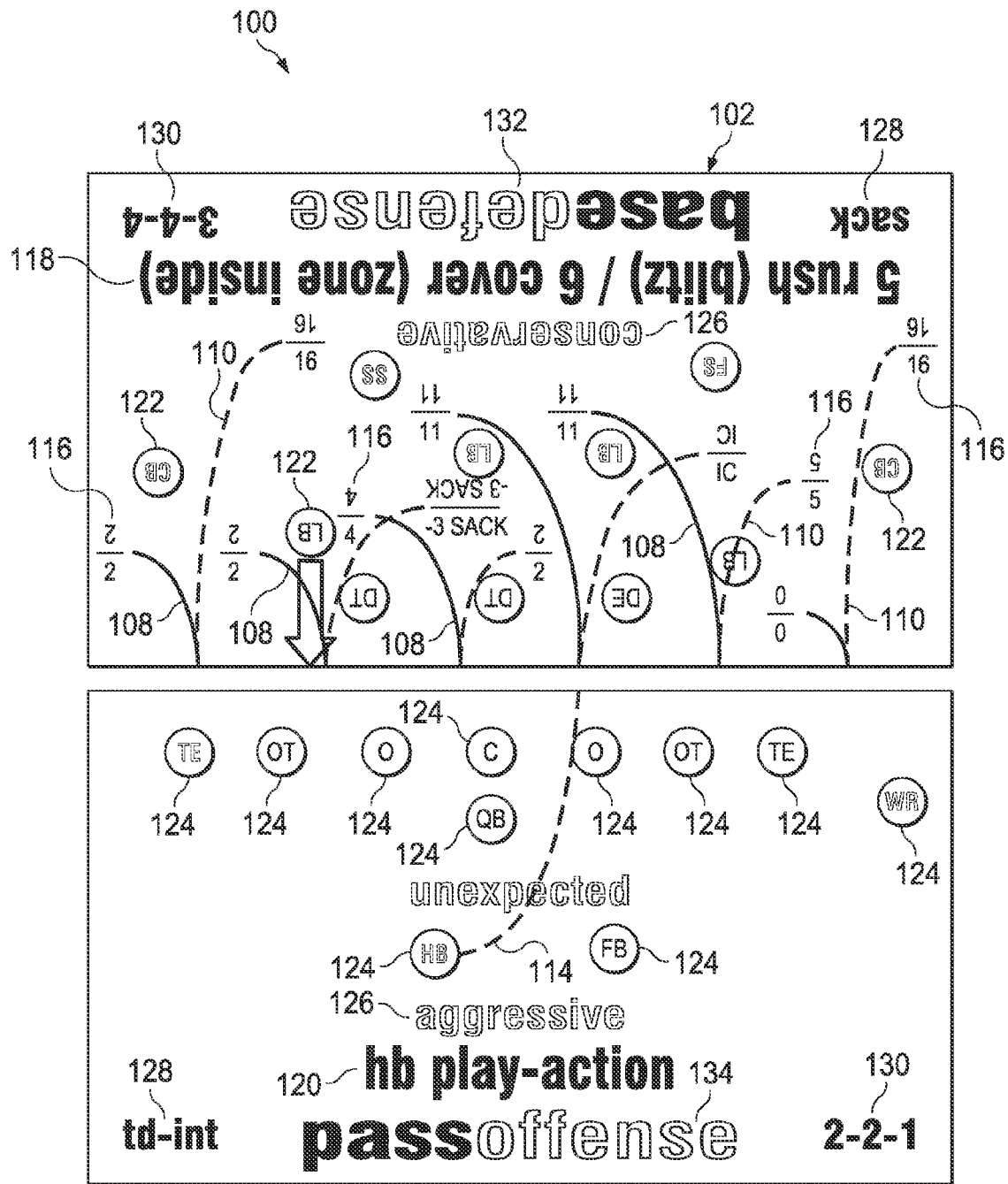
Figure 17:
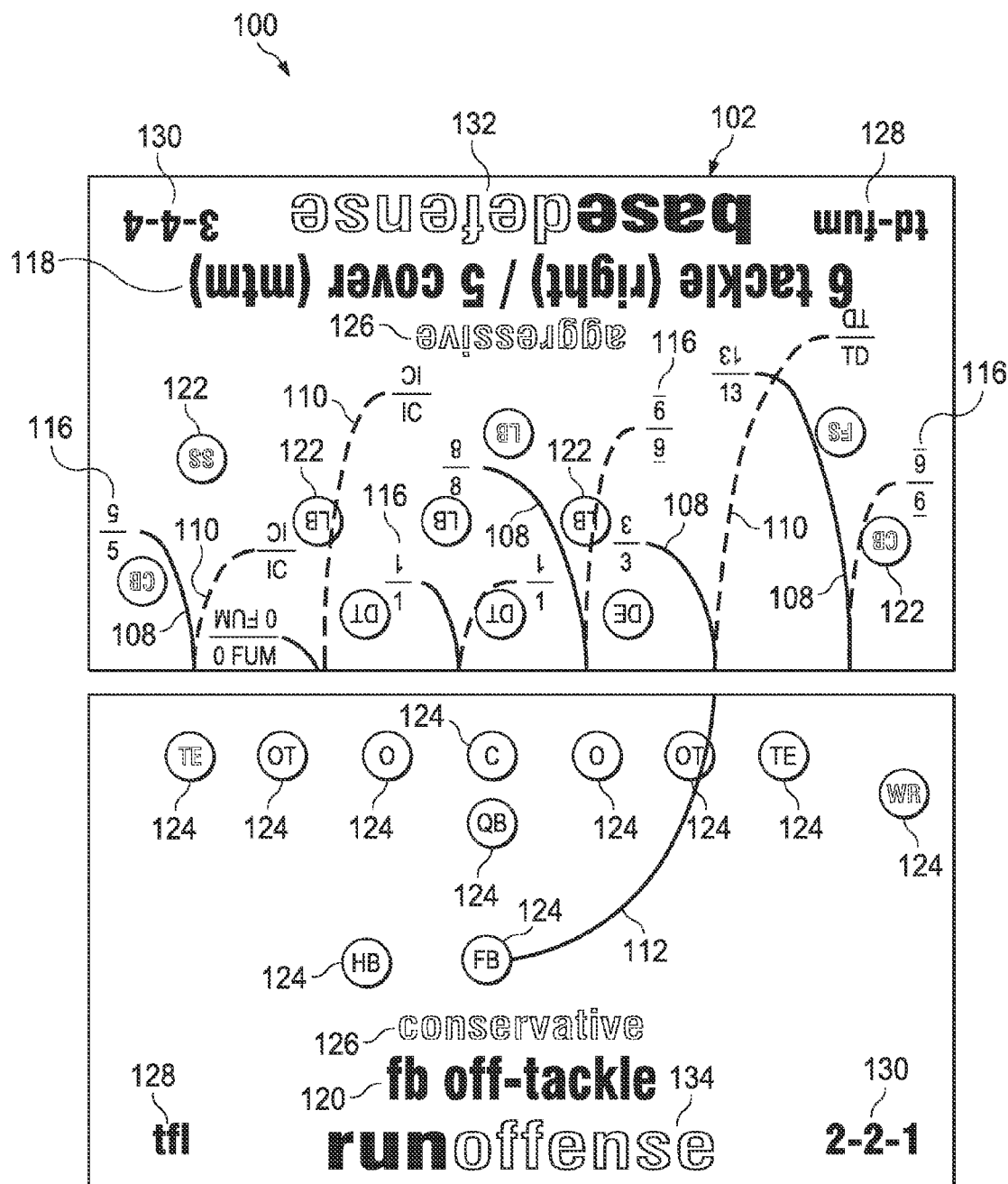
Figure 18:
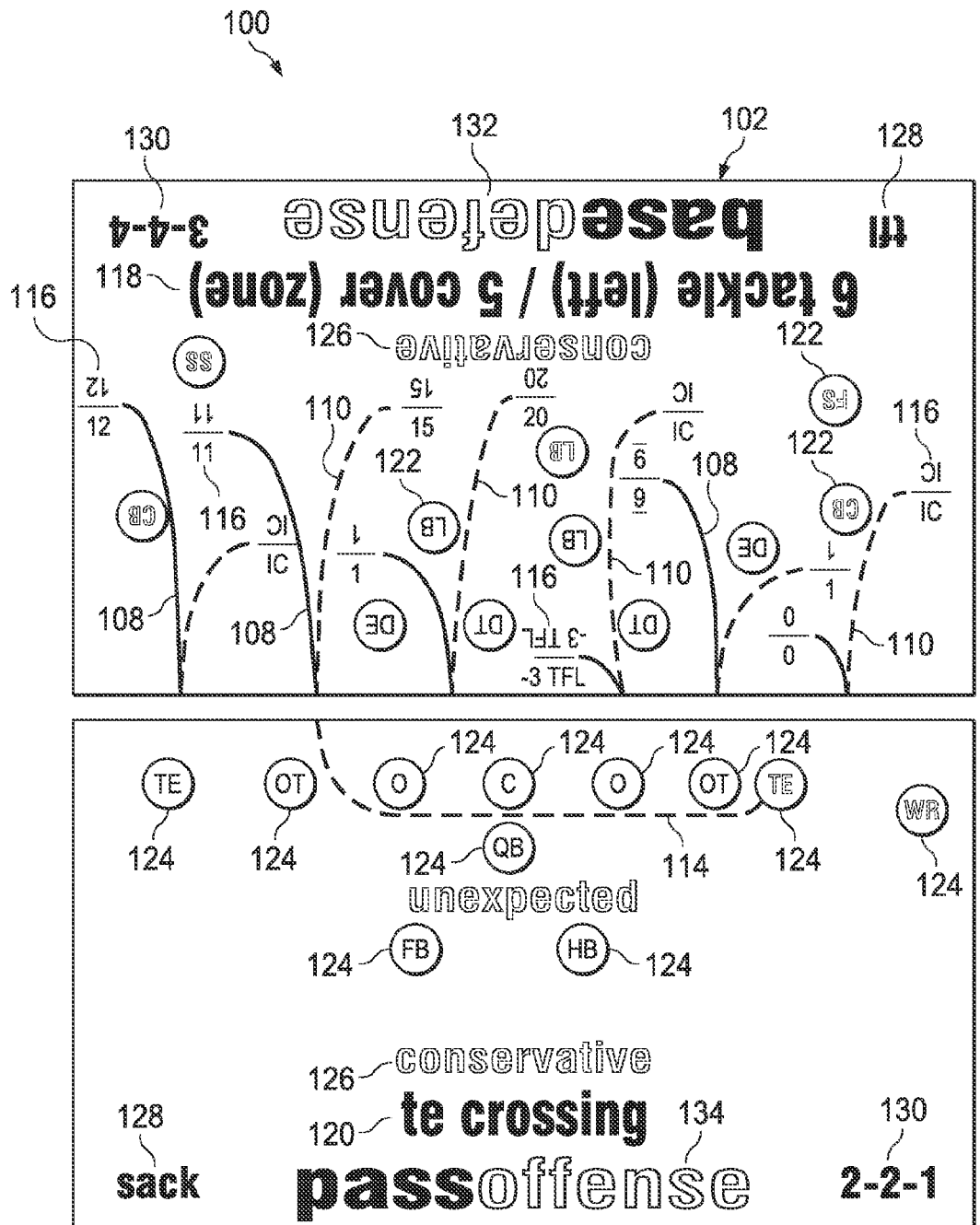

As also shown in FIGS. 4 and 7-18, play risk indicator 126 provides information on the risk associated with that particular defense card 102. For example, as shown in FIG. 13, play risk indicator 126 states that this defensive play is "CONSERVATIVE," while, as shown in FIG. 14, play risk indicator 126 states that this defensive play is "AGGRESSIVE." Play risk indicator 126 relates to extreme outcome indicator 128 in that "CONSERVATIVE" plays only have a defensive best case scenario, such as "SACK" in FIG. 9, while "AGGRESSIVE" plays have both a defensive best and worst case scenarios, such as "TD-INT" in FIG. 10. Also shown in FIGS. 4 and 7-18 is defense type indicator 132, which conveys the type of offense against which this defensive play is best suited to guard. In a preferred embodiment for a football game, as shown in FIGS. 7-18, defense type indicator 132 can indicate whether a defense card 102 is for a "RUN DEFENSE," a "PASS DEFENSE," or a "BASE DEFENSE." In a preferred embodiment, card game 100 would include a deck where one-third of defense cards 102 are "RUN DEFENSE" one-third of defense cards 102 are "PASS DEFENSE," and one-third of defense cards 102 are "BASE DEFENSE."

Figure 5:
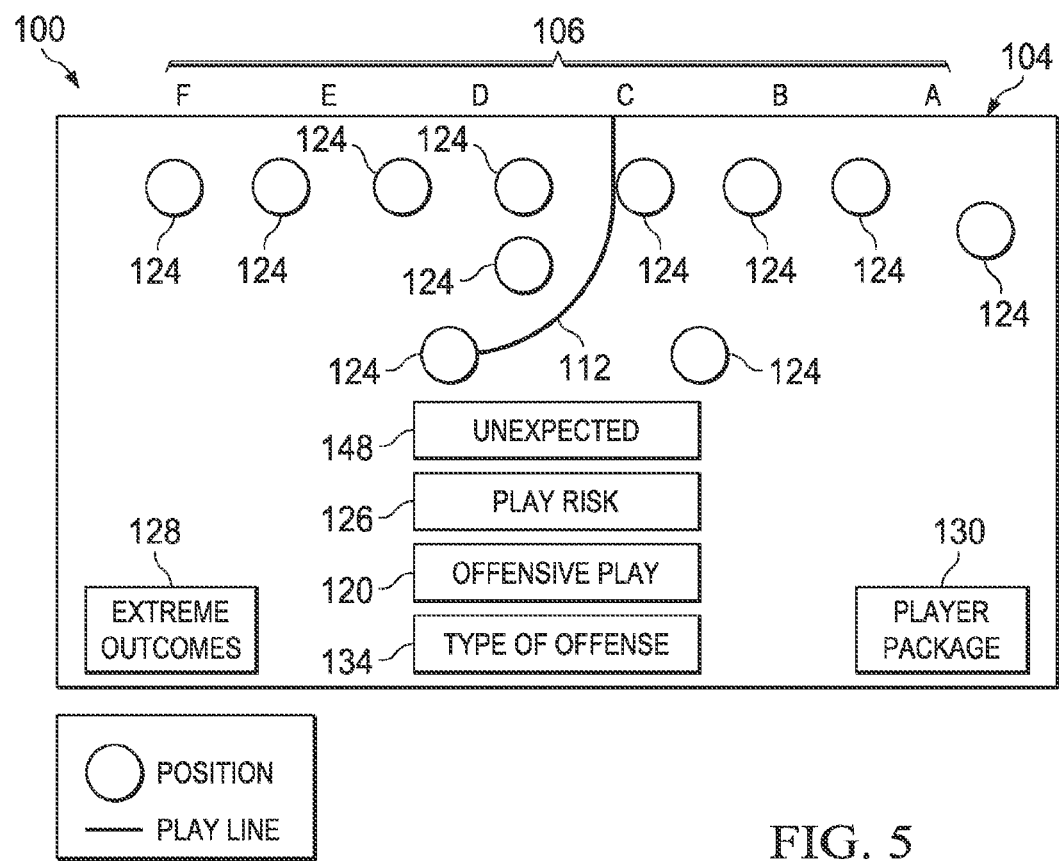
FIG. 5 is a top elevation view of the face of an offense card with a single play line, player positions, and additional details about the play.
Figure 6:
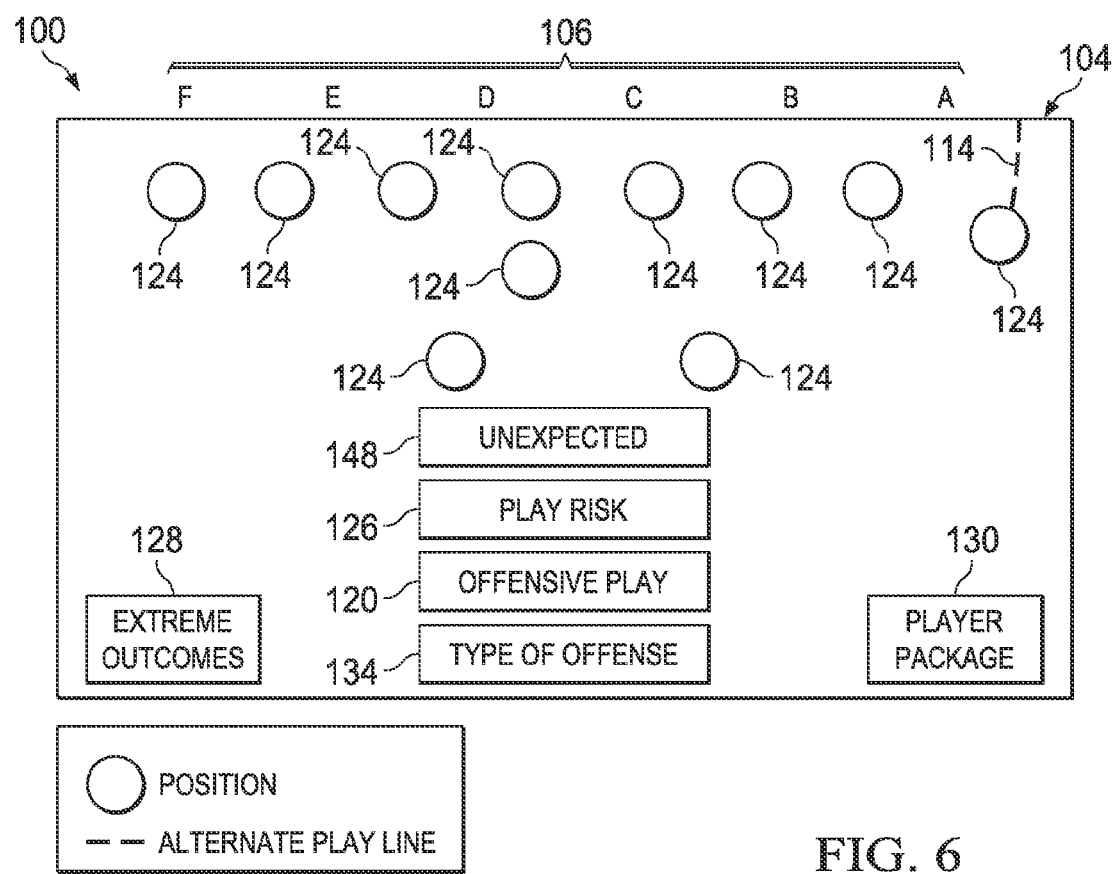
FIG. 6 is a top elevation view of the face of an offense card with a single alternate play line, player positions, and additional details about the play.
Figure 7:
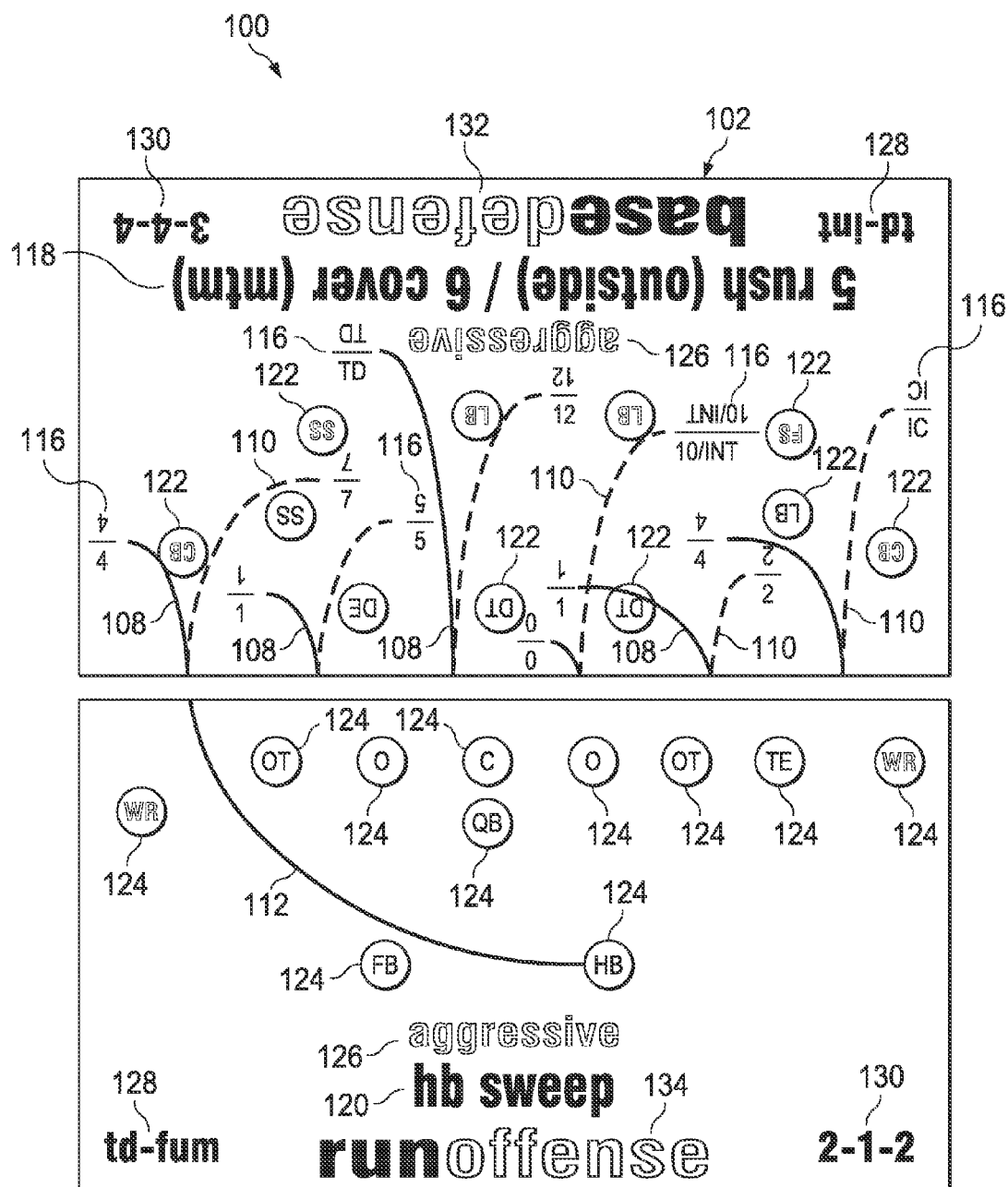
FIGS. 7-18 are various top elevation views of a preferred embodiment where a unique football offense card and a unique football defense card are aligned in sample combinations to provide a particular diagrammatic solution to a play outcome.
Figure 8:
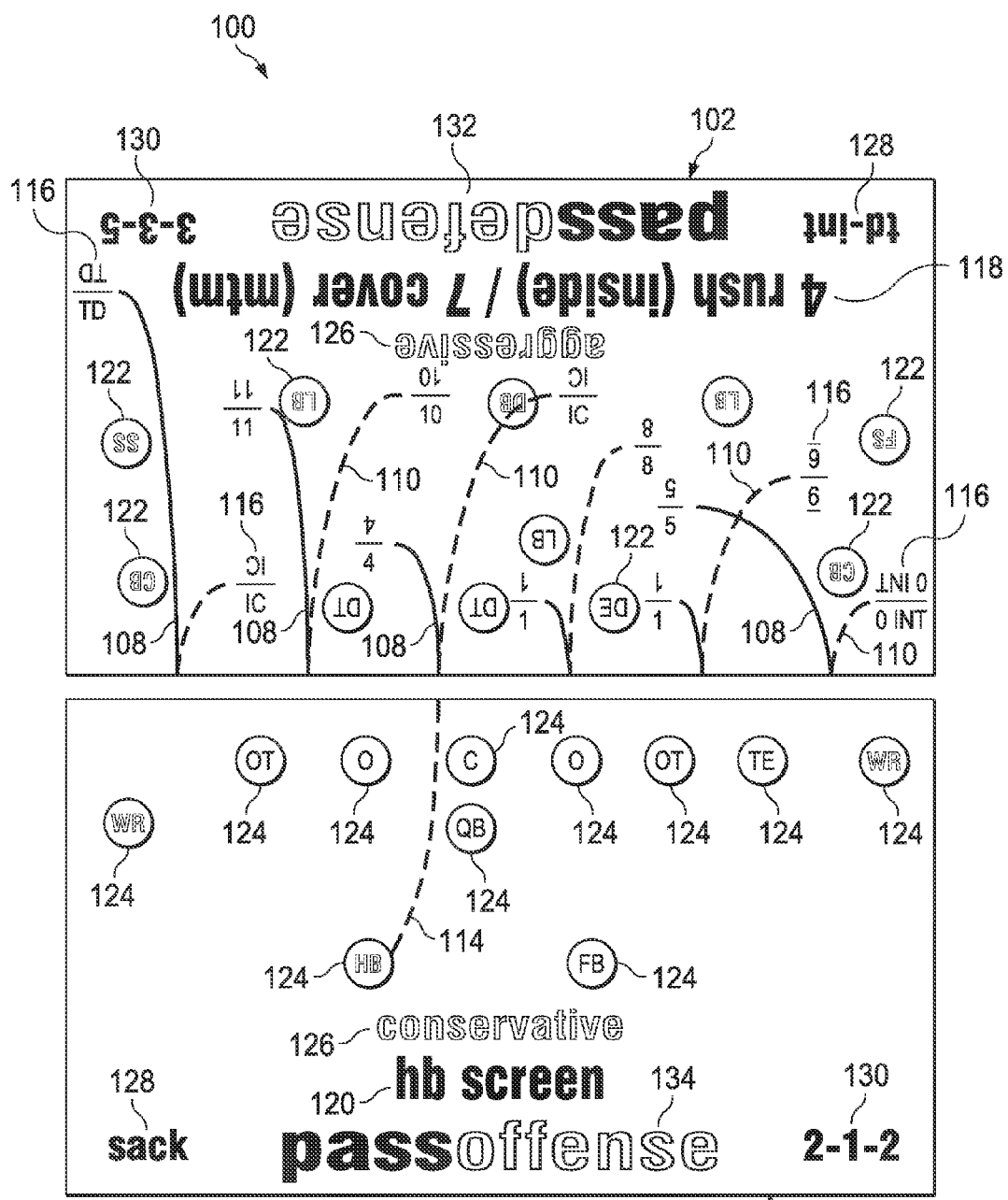
Figure 9:
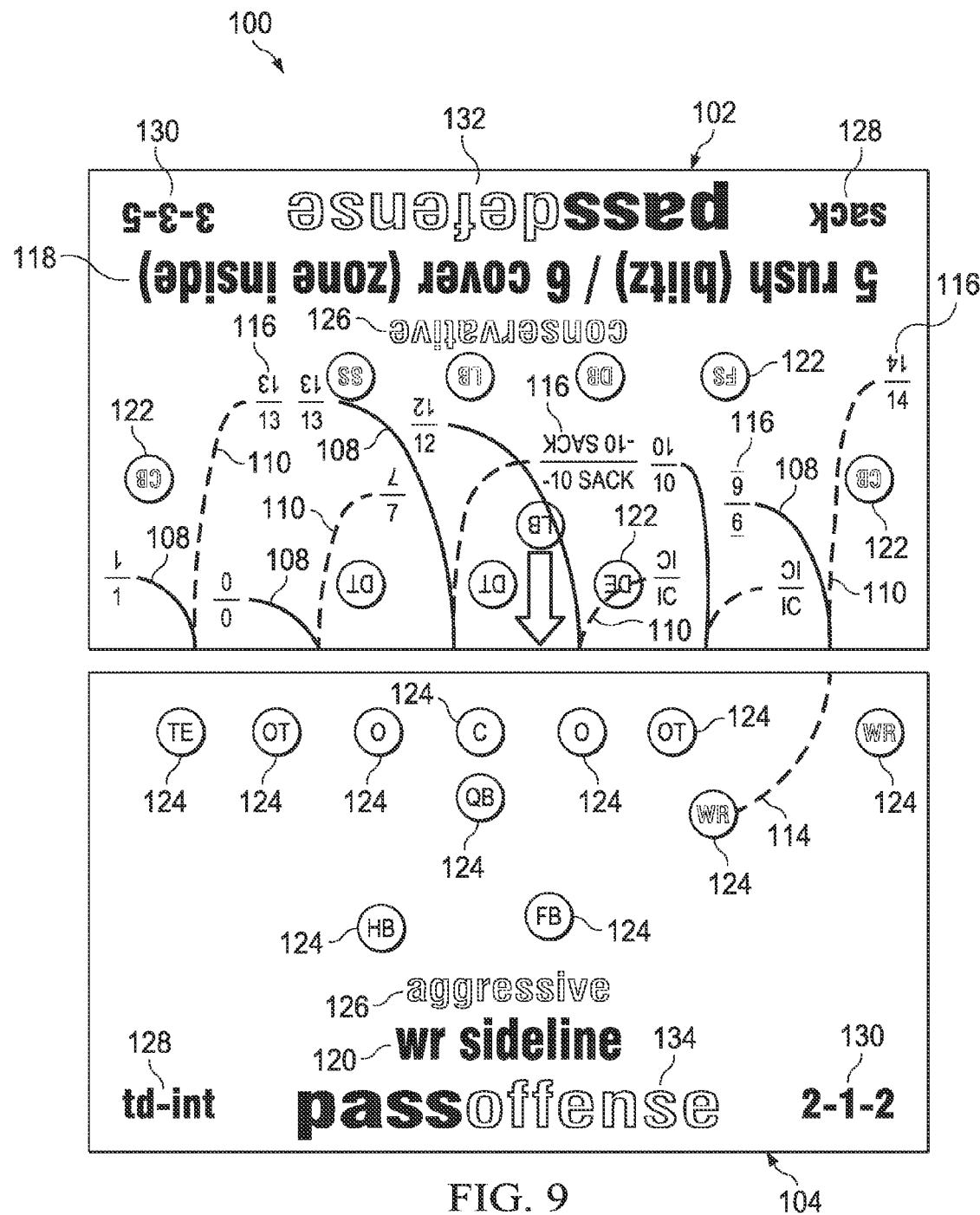
Figure 10:
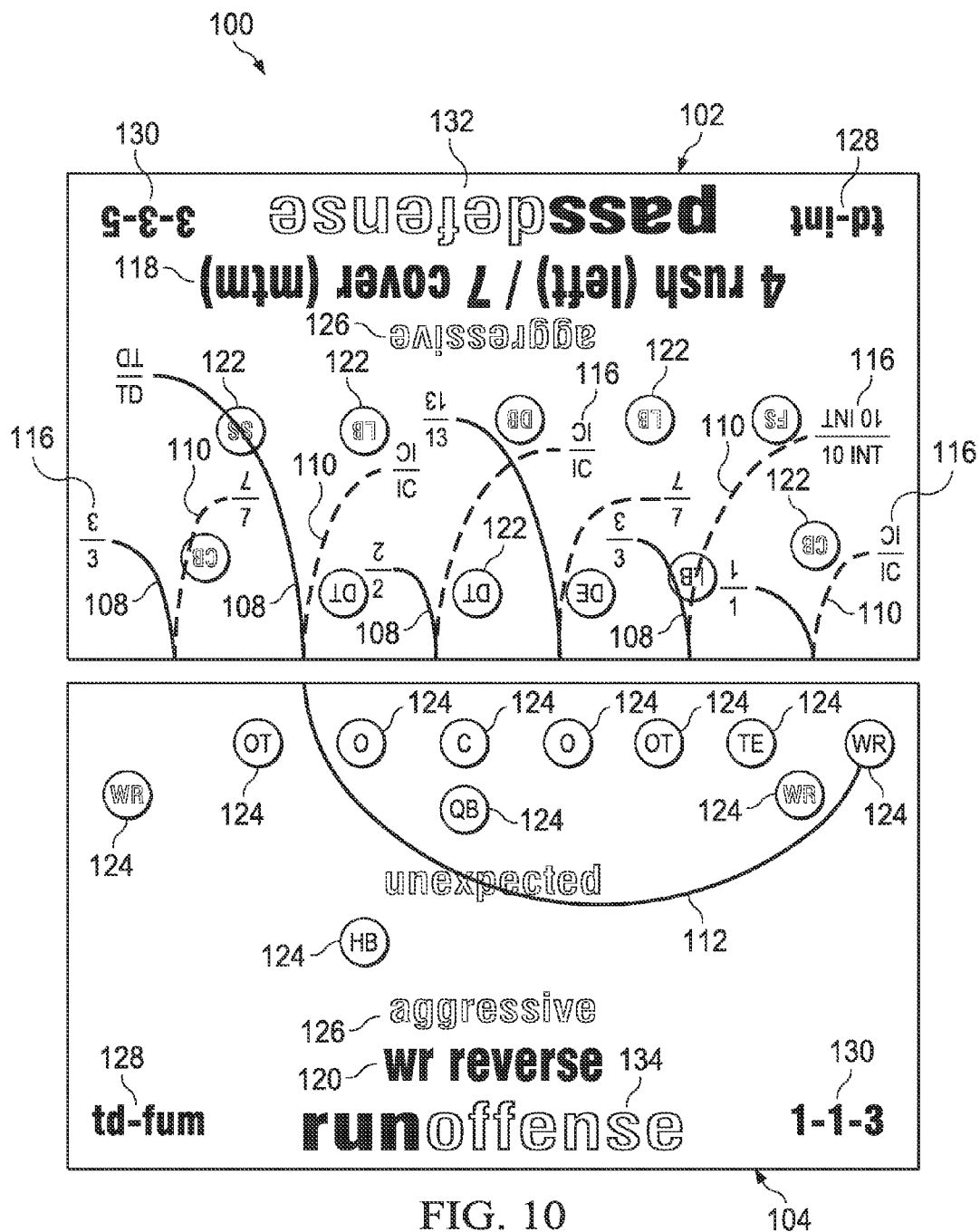

As shown in FIGS. 5-18, an offense card 104 can also desirably include additional details. For example, as shown in FIGS. 5 and 6, offense card 104 can include offensive player positions 124, a play risk indicator 126, an extreme outcome indicator 128, a player package indicator 130, an offense type indicator 134, and an unexpected play indicator 148. As shown in FIGS. 5 and 6, play line 112 or alternate play line 114 can start at an offensive player position 124 and lead to a lane 106. In a preferred embodiment for a football game, offense card 104 can include 11 offensive player positions 124 to represent the 11 offensive players on the field for a football team. Additionally, as shown in FIGS. 7-18, offensive player positions 124 can be labeled with an offensive position, such as "QB" for quarterback or "WR" for wide receiver. Player package indicator 130 indicates the formation and alignment of the offensive players, such as "2-2-1," "2-1-2," or "1-1-3," which indicate the number of running backs, tight-ends, and wide receivers, respectively Also as shown in FIGS. 5 and 6, an offense card 104 can optionally include an unexpected play indicator 148. Unexpected play indicator 148 appears on an offense card 104 when player package indicator 130 is a player package that is typically associated with a different type of offense than the one actually featured on that offense card 104. For example, the offense cards 104 in both FIGS. 12 and 13 have the same player package indicators 130 with "1-1-3" as the formation. However, the offense card 104 in FIG. 12 is a pass offense while the offense card 104 in FIG. 13 is a run offense. FIG. 13 has an unexpected play indicator 148 that signals that player package indicator 130 is a player package that is typically associated with pass offenses but is, nevertheless, included here on an offense card 104 with a run offense player package.

Extreme outcomes indicator 128 provides information on the most extreme, or worst and best case, scenarios for play outcomes 116 across all defense cards 102. For example, in FIG. 10, extreme outcome indicator 128 conveys that a touchdown ("TD") is the best case scenario and a fumble ("FUM") is the worst case scenario for the offense when playing that offense card 104. As another example, in FIG. 11, extreme outcome indicator 128 conveys that a tackle-for-loss ("TFL") is the worst case scenario for the offense when playing that offense card 104.

As also shown in FIGS. 5, 6, and 7-18, play risk indicator 126 provides information on the risk associated with that particular offense card 104. For example, as shown in FIG. 11, play risk indicator 126 states that the play is "CONSERVATIVE," while, as shown in FIG. 12, play risk indicator 126 states that the play is "AGGRESSIVE." Play risk indicator 126 relates to extreme outcome indicator 128 in that "CONSERVATIVE" plays at worst result in a tackle for loss ("TFL") or sack ("SACK"), do not result in a turnover such as a fumble or interception, but also do not have a best case scenario. On the other hand, "AGGRESSIVE" plays have both an offensive best and worst case scenarios, such as "TD-FUM" in FIG. 15. Also shown in FIGS. 5, 6, and 7-18 is offense type indicator 134, which conveys the type of offense that is being played. In a preferred embodiment for a football game, as shown in FIGS. 7-18, offense type indicator 134 can indicate whether an offense card 104 is for a "RUN OFFENSE" or a "PASS OFFENSE." In a preferred embodiment, card game 100 would include a deck where half of offense cards 104 are "RUN OFFENSE" and half of offense cards 104 are "PASS OFFENSE." In a preferred embodiment of the invention, card game 100 comprises twelve offense cards 104 with four cards each having the same player package provided by player package indicator 130 for a total of three unique offensive player packages as specified by player package indicator 130. Similarly, card game 100 comprises twelve defense cards 102 with four cards each having the same player package provided by player package indicator 130 for a total of three unique defensive player packages as specified by player package indicator 130.

Basic Play-Calling, Game Progression, and Kicking

The method of playing card game 100 involves two players taking turns being offense and defense. In a basic play, the player on offense selects an offense card 104 from the offense card deck and then places that card face down. The player on defense then selects a defense card 102 from the defense card deck and places that card face down. The players then flip over offense card 104 and defense card 102 and align the top edges of offense card 104 and defense card 102. After offense card 104 and defense card 102 are aligned, the players can read the play outcome 116 on defense card 102 by tracing play line 112 or alternate play line 114 on offense card 104 to the corresponding play path 108 or alternate play path 110 in the corresponding lane 106 on defense card 102. In a preferred embodiment of the invention for a football game, play paths 108 and play lines 112 indicate running plays while alternate play paths 110 and alternate play lines 114 indicate passing plays.

Figure 19:
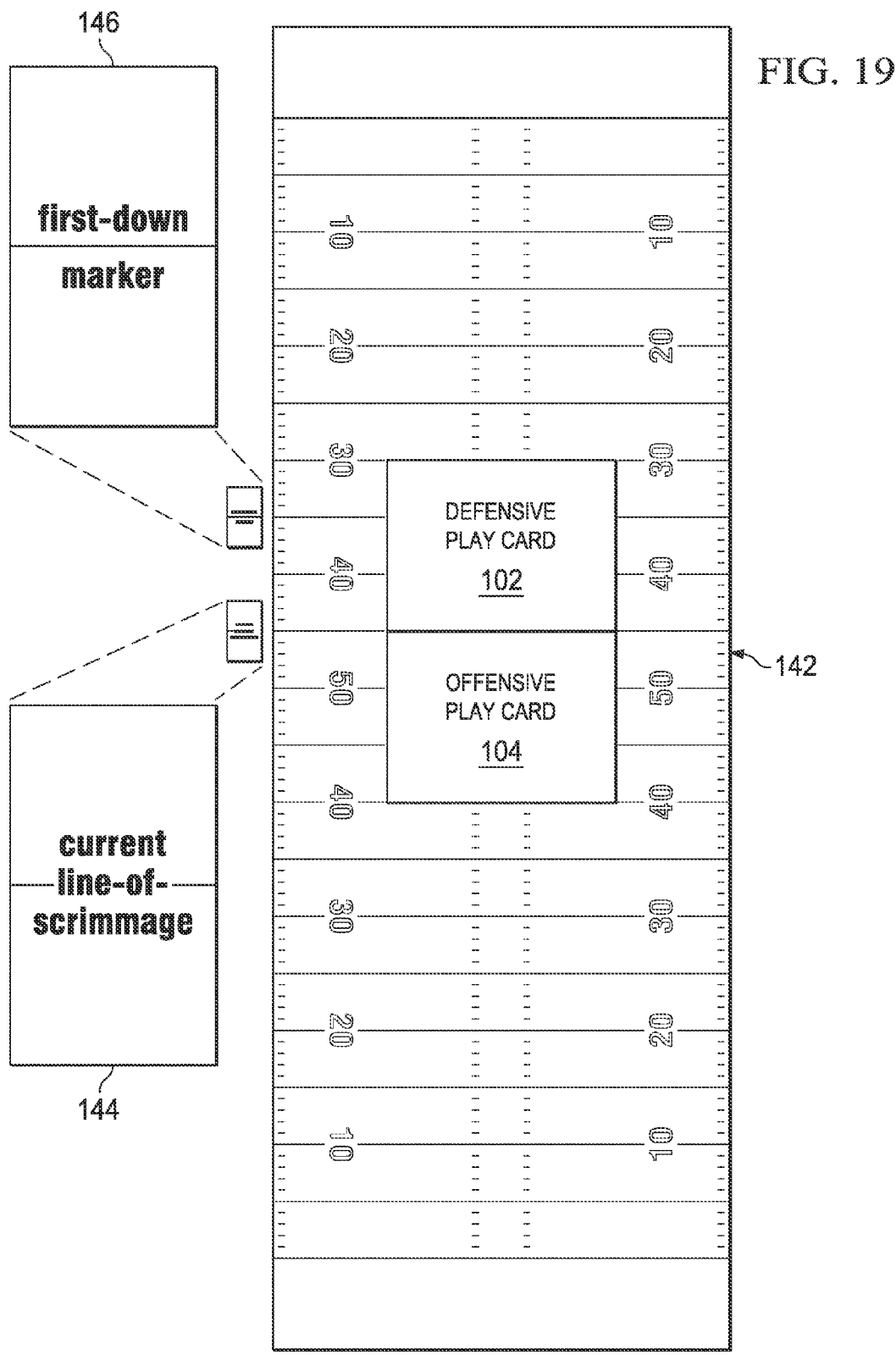
FIG. 19 is a top elevation view of a preferred embodiment where an optional current line-of-scrimmage and an optional first-down marker on an optional football field board mark the position of a defensive and offensive card aligned on the football field.

As shown in FIG. 19, in a preferred embodiment of the invention for a football game, an optional game field board 142, a line-of-scrimmage marker 144, and a first-down marker 146 are provided. Line-of-scrimmage marker 144 and first-down marker 146 can be used to track play outcomes 116 on game field board 142. In a preferred embodiment for a football game, some American football game rules can be applied to the progression of card game 100. For example, the player on offense can have four downs (or attempts) to obtain a first-down or a touchdown. A touchdown is scored as 7 points to simplify scoring and eliminate complications related to extra point attempts. A basic play as described above is performed for each down or attempt. If yards are gained or lost as determined by a given play outcome 116, then line-of-scrimmage marker 144 and first-down marker 146 can be moved up or down the field as appropriate. For example, if a play outcome 116 is a 9-yard gain, then line-of-scrimmage marker 144 is advanced 9 yards toward first-down marker 146 toward game field board 142. If the yardage gain provided by play outcome 116 causes line-of-scrimmage marker 144 to reach or exceed the position of first-down marker 146, then first-down marker 146 is placed at a position that is 10 yards down the field from line-of-scrimmage marker 144. If the yardage gain provided by play outcome 116 causes line-of-scrimmage marker 144 to reach the end-zone of game field board 142, then the offense scores a touchdown and the players switch offense and defense roles and decks. If play outcome 116 results in a turnover, such as a fumble or interception, the players also switch offense and defense roles and decks and reposition line-of-scrimmage marker 144 and first-down marker 146 on game field board 142. Players also switch offense and defense roles and decks should a turnover on downs occur, meaning that a player on offense fails to achieve a first down or touchdown on a fourth down.

Players can flip a coin or use another random event, such as by using dice or a random number generator, to determine which player is on offense first (i.e., "receives the ball"). As shown in FIGS. 20-22, in a preferred embodiment of the invention, card game 100 is also optionally provided with kick-off table 136, punt table 138, and field goal table 140. The player on the "kicking team" rolls dice and uses the result of the dice rolls and the table to determine the effect on the game play. As shown in FIG. 20, for example, a "kick" (dice roll) from kick-off table 136 can result in a fumble, a return for a touchdown, or simply the movement of the ball down game field 142 a certain number of yards. FIG. 20 depicts a kick-off table 136 with different outcomes based on a certain game event, such as an on-side kick, a kick-off after a safety, or a "normal" kick-off to start the game, to start the half, or after a touch-down is scored. As shown in FIG. 21, a "punt" (dice roll) from punt table 138 can result in a fumble, a block with a loss of yardage, a return for a touchdown, or the movement of the ball down game field 142 a certain number of yards. FIG. 21 depicts a punt table 138 with different outcomes based on certain game events, such as a pooch and a "normal" punt that is typically taken on a fourth down to avoid a turnover on downs. As shown in FIG. 22, a "field goal kick" (dice roll) from field goal table 140 can result in a block returned for a touchdown, a block for a loss of yards, a missed field goal and turn over to the other team, or a successful field goal for three points. FIG. 22 depicts a field goal table 140 with different outcomes based on the current location of line-of-scrimmage marker 144.

Play Calling Variations

In a preferred embodiment, the players can have multiple options for play calling variations. For example, players can call plays by basic play calling, by enhanced play calling, by killing to a second play, by calling an audible, and by going no-huddle. Basic play calling proceeds as previously described above. The player on offense picks an offense card 104 without knowing what card will be played by the player on defense. The player on defense then picks a defense card 102 without knowing what card is being played by the player on offense. Both players flip their cards over and align their top edges to determine play outcome 116. Essentially, the player on offense picks a play without any knowledge of the defense's play or player package, and the player on defense also picks a play without any knowledge of the offense's play or player package.

As one option, the players can opt for "enhanced play calling." In this play calling variation, the player on offense selects an offense card 104 from the offense card deck but does not immediately reveal that card to the player on defense. The player on offense then announces the player package provided by player package indicator 130, such as "2-1-2," and then places offense card 104 face down. The player on defense then selects a defense card 102 from the defense card deck and places it face down. Both players flip their cards over and align their top edges to determine play outcome 116. With this play calling variation, the player on offense is picking plays without any knowledge of the defense's play or player package while the player on defense picks a play knowing the offense's player package but not knowing the offense's specific play.

As another option, players can opt to have the ability to "kill to a second play." In this play calling variation, the offense pre-selects two offense cards 104 with their player package indicators 130 with the same player package. The offense announces the player package and places both offense cards 104 face down with the backup or "kill" play placed beneath the first play. The defense then selects a defense card 102, announces the player package provided by player package indicator 130, and places defense card 102 face down. The offense has the option of either playing the first offense card 104 by leaving it on top or announcing that the offense will "kill" to the second play and placing the backup offense card 104 on top. The players then flip over their cards and align their top edges to determine play outcome 116. With this play calling variation, the player on offense is picking player packages without any knowledge of the defense's play or player package while the player on defense picks a play knowing the offense's player package but not the offense's specific play. After having knowledge of the defense's player package, the offense can pick one of two plays.

As yet another option, players have the option to play with the ability to "call an audible." In this play calling variation, the offense pre-selects four offense cards 104 that have player package indicators 130 with the same player package. The offense announces the player package and places all four offense cards 104 face down in any order that the player chooses. The defense then selects a defense card 102, announces the player package provided by player package indicator 130, and places defense card 102 face down. The offense then can select any one of the four offense cards 104 and place it on top as the card to be played. The players then flip over their cards and align their top edges to determine play outcome 116. Similar to the "kill" play calling variation, the player on offense is still picking player package without any knowledge of the defense's player package while the player on defense picks a play knowing the offense's player package. After having knowledge of the defense's player package, the offense can pick any one of the four plays initially selected.

Additionally, players have the option to play with the ability to proceed "no huddle." In this play calling variation, the offense can basically lock-in the defensive and offensive player packages if the player on offense feels that he or she has a competitive advantage based on the relative player packages. After a play is completed, the offense can announce "no huddle," and both offense and defense can only play cards with the same player packages as provided by player package indicators 130 in the cards from the immediately prior play. The defense selects a defense card 102 with the same player package as its prior play, and the offense selects an offense card 104 with the same player package as its prior play. The players then flip over their cards and align their top edges to determine play outcome 116. The offense can continue to call plays in this "no huddle" play calling variation for as long as it wishes, until it scores, or until it turns the ball over.

A Preferred Embodiment for Computer Devices

The system of the invention comprises the playing of card game 100 in an electronic format, such as on a personal computer, laptop, video game console, handheld game device, mobile phone, tablet, or heads-up display computing devices (such as Google Glass). As shown in FIG. 23, card game 100 could be programmed to be played on one or more devices 300 in any suitable programming language, any operating system, or on any mobile phone development platform. Players can play against each other online or in-person. Two devices could be connected directly or indirectly via, for example, a cable or wire connector, local area networks, Wi-Fi, broadband connections, phone network systems, phone-to-phone beaming (such as S-Beam), Bluetooth, or infrared. Flipping of the cards can be accomplished in a variety of methods, such as with a designated key, a touch screen button, or by using a device's haptic feedback, accelerometer, or gyroscope. For example, a pair of mobile phones can be tapped or bumped together to initiate the flipping of the cards and resolution of play outcome 116. Moreover, card game 100 can be played on one device. This design can be accomplished, for example, by making card game 100 turn-based and requiring players to take turns selecting their cards on the same device. As shown in FIG. 23, the characteristics and features of defense card 102 and offense card 104 can be displayed on a screen 302. Additionally, the graphical solution to determine the play result can be displayed on one or more mobile device screens. The alignment of the cards, solution of the play, and determination of play outcome 116 can be accounted for automatically by the game program. The program can also depict and automatically update game progression and positioning on a digital representation of game field board 142. As shown in a preferred embodiment for a football game in FIGS. 24A-24I, this version of card game 100 comprises a series of sequences 200A-200I.

Starting Game Sequence

As shown in FIG. 24A, starting game sequence 200A commences game play. Step 202 is the start of this sequence and optionally provides introductory information, graphics, or sound.

Step 204 prompts a user to select a game type options. For example, step 204 can provide choices for connection type and game length or can prompt a player to modify or reset game settings. Step 204 also provides a prompt to begin game play.

At step 206, a connection between players is established and information is exchanged to initialize the game. For example, this connection could be established by a physical bump between two mobile phones or by selecting an option (e.g., click a button) for a connection via any of the connection methods described above. After this interaction the game automatically progresses to the next step in this sequence. Beyond this point the players progress through the game in tandem with periodic interactions at certain points until the game ends.

At step 208, order of play is decided by a process that models a simple binary outcome of equal probability analogous to a coin flip. In a preferred embodiment for a football game, a player will either kick-off or return a kick-off. If a player is kicking off, the game will progress to kicking-off sequence 200B while if a player is returning a kick-off sequence 200C.

Kicking-Off Sequence

As shown in FIG. 24B, kicking-off sequence 200B commences a kick-off play. Step 210 analyzes and determines if the game should continue or end based on the score, time-elapsed, or cumulative number of possessions to this point. The length of the game could have been selected in step 204 as a fixed score to win, a fixed amount of time to play, or a fixed number of possessions per side. If the game should terminate based on score, time, or total possessions, step 218 ends the game and optionally displays or announces the score, winning player, and game statistics.

If the game does not end, step 212 prompts a user to select a type of kick-off, such as an on-side kick or a normal kick. The kick-off type selection is limited to "after safety" style kicks in the case where a safety has occurred, and excludes "after safety" style kicks in the case where a safety has not occurred.

Step 214 is the kick-off interaction between the players where the kicking player is optionally provided with graphics and sound consistent with the selected type of kick-off and the returning player is optionally provided with graphics or sound consistent with returning a kick-off. The players initiate an interaction by, for example, a physical bump between two mobile phones or by selecting an option (e.g., click a button) that exchanges information about the kick-off play via any of the connection methods described above.

Step 216 models the rolling of three dice and the outcome from kick-off table 136 based on the combined total dice roll. Kick-off table 136 is depicted in FIG. 20 and consists of a table of outcomes versus dice roll totals. Depending on the outcome from step 216, the game will progress to one of three sequences. If the kick-off was fielded, the game progresses to defensive play sequence 200D for the kicking player and offensive play sequence 200E for the returning player. If the kick-off was fumbled, the game progresses to offensive play sequence 200E for the kicking player and defensive play sequence 200D for the returning player. If the kick-off was returned for a score, the game progresses to the beginning of returning kicking-off sequence 200C where the kicking player is now returning a kick-off, and to kicking-off sequence 200B for the returning player, who is now kicking-off.

Returning Kick-Off Sequence

As shown in FIG. 24C, returning kick-off sequence 200C operates in tandem with kicking-off sequence 200B. Steps 210, 214, 216, and 218 operate as described above.

Defense Play Sequence

Figure 24D:
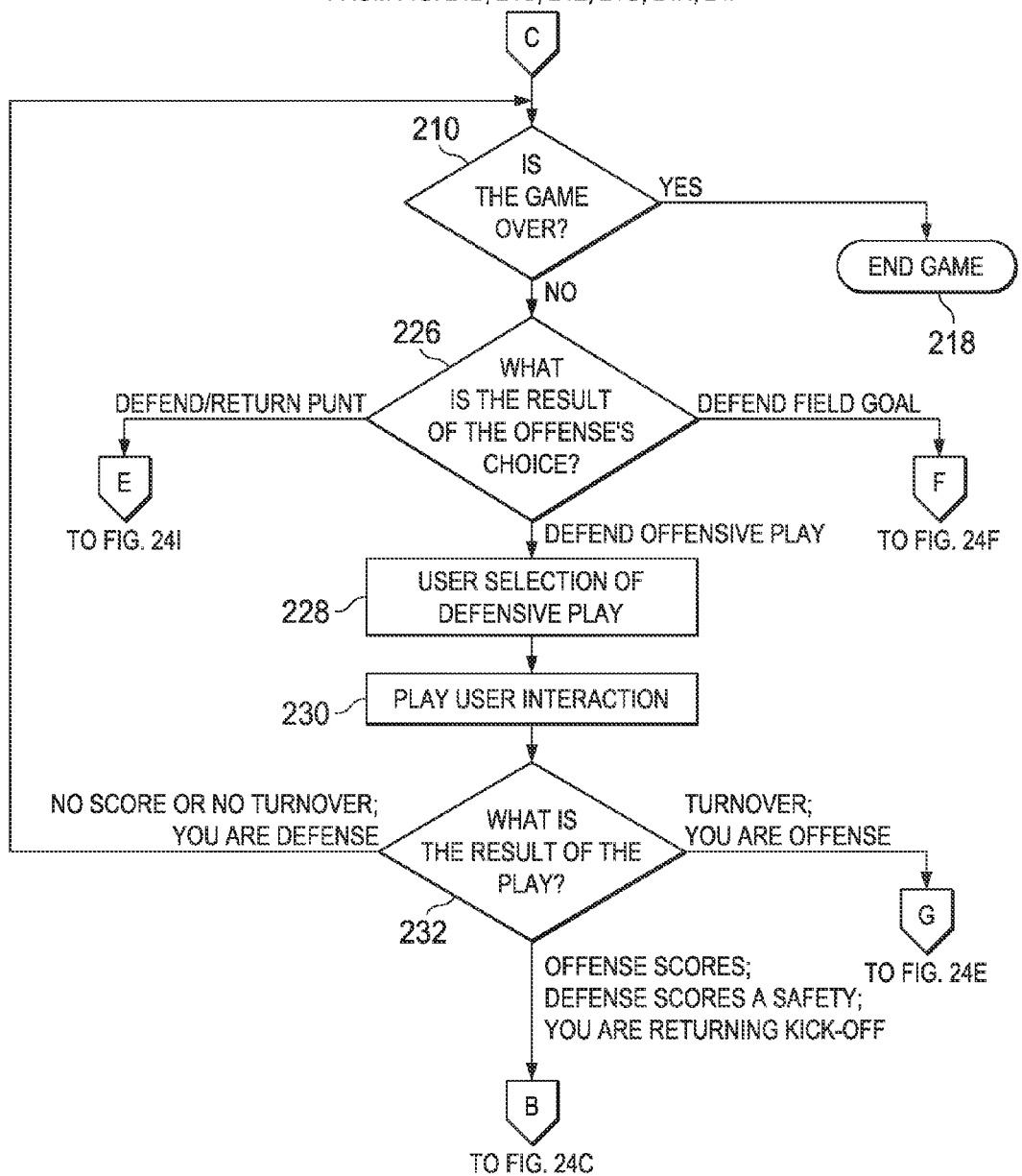
FIG. 24D depicts processing logic for a defensive play sequence of a preferred embodiment for an electronic version of the card game.

As shown in FIG. 24D, defense play sequence 200D operates on the device for the player on defense and provides prompts for defensive plays. Steps 210 and 218 operate as described above.

Step 226 provides information on whether the player on offense elected to kick a punt, kick a field goal, or call an offensive play. If the player on offense elects to punt, the game progresses to returning punt sequence 200I for the player that was just on defense and to kicking punt sequence 200G for the player that was just on offense. If the player on offense elects to kick a field goal, the game progresses to defending field-goal sequence 200F for the player that was just on defense and to kicking field-goal sequence 200H to the player that was just on offense. If the player on offense elects to call an offensive play, step 228 prompts the player on defense to select a defensive play.

Step 230 is the play interaction between the players where the player on offense is optionally provided with graphics and sound consistent with the selected offensive play, and the player on defense is optionally provided with graphics or sound consistent with the selected defensive play. The players initiate a play interaction by, for example, a physical bump between two mobile phones or by selecting an option (e.g., click a button) that exchanges information about the selected plays via any of the connection methods described above.

Step 232 determines the outcome of the play based on combining the selected defense and offense plays and is an analog to the diagrammatic play solution applied to the physical card game as already described. If the play result is a score for the offense or a safety, the game progresses to returning kick-off sequence 200C for the player that was just on defense and to kicking-off sequence 200B for the player that was just on offense. If the play result is a turn-over, including a turn-over on downs, the game progresses to offensive play sequence 200E for the player that was just on defense and to defensive play sequence 200D for the player that was just on offense. If the play result is not a score, safety, or turn-over, the game progresses to the beginning of defensive play sequence 200D for the player that was just on defense and to offensive play sequence 200E for the player that was just on offense.

Offense Play Sequence

Figure 24E:
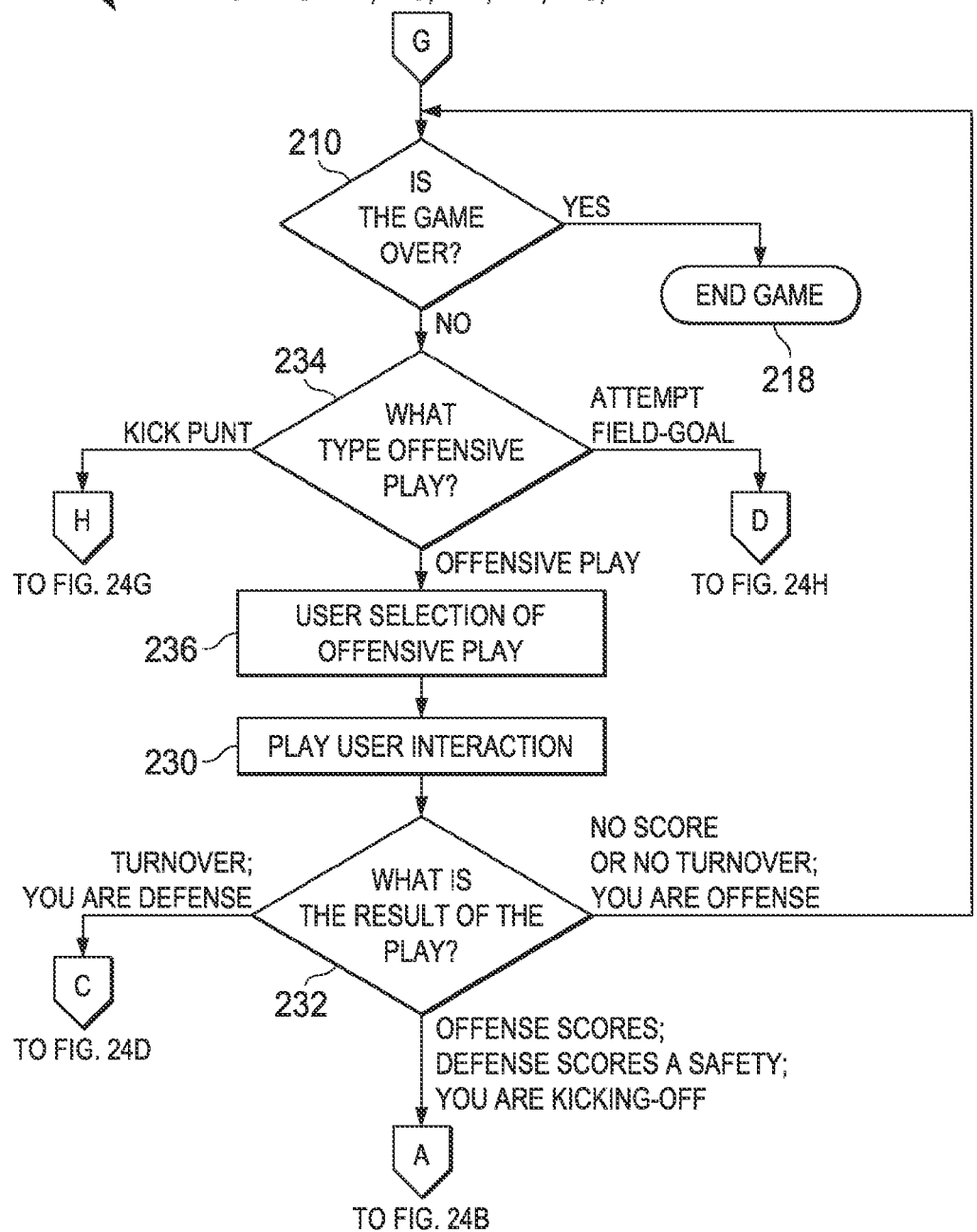
FIG. 24E depicts processing logic for an offensive play sequence of a preferred embodiment for an electronic version of the card game.

As shown in FIG. 24E, offense play sequence 200E operates on the device for the player on offense and provides prompts for offensive plays. Steps 210 and 218 operate as described above.

Step 234 prompts the player on offense to elect to kick a punt, to kick a field goal, or to call a play. If the player on offense elects to punt, the game progresses to returning punt sequence 200I for the player that was just on defense and to kicking punt sequence 200G for the player that was just on offense. If the player on offense elects to kick a field goal, the game progresses to defending field-goal sequence 200F for the player that was just on defense and to kicking field-goal sequence 200H to the player that was just on offense. If the player on offense elects to call an offensive play, step 236 prompts the player on offense to select an offensive play.

Steps 230 and 232 operate as described above. Defensive play sequence 200D and offensive play sequence 200E operate in tandem and are complementary processes. For this reason step 232 in FIG. 24D is depicted with a loop to the start of defensive play sequence 200D while in FIG. 24E it is depicted with a loop to the start of offensive play sequence 200E.

Defending Field Goal Sequence

As shown in FIG. 24F, defending field-goal sequence 200F operates in tandem with kicking field-goal sequence 200H. Steps 210 and 218 operate as described above.

Step 240 is the field-goal interaction between the players where the kicking player is optionally provided with graphics and sound consistent with the selected type of field-goal and the returning player is optionally provided with graphics or sound consistent with defending a field-goal. The players initiate an interaction by, for example, a physical bump between two mobile phones or by selecting an option (e.g., click a button) that exchanges information about the field-goal play via any of the connection methods described above.

Step 242 models the rolling of three dice and the outcome from field goal table 140 based on the combined total dice roll. Field goal table 140 is depicted in FIG. 22 herein and consists of a table of outcomes versus dice roll totals. Depending on the outcome from step 242, the game will progress to one of three sequences. If the field-goal is missed or blocked, the game progresses to defensive play sequence 200D for the kicking player and offensive play sequence 200E for the defending player. If the field-goal is blocked and returned for a touchdown, the game progresses to kicking off sequence 200B for the defending player, who will now be kicking off, and to returning kick-off sequence 200C for the kicking player, who will now be returning a kick-off. If the field-goal attempt is successful for a score, the game progresses to kicking off sequence 200B for the kicking player, who will now be kicking off, and to returning kick-off sequence 200C for the defending player, who will now be returning a kick-off.

Kicking Punt Sequence

As shown in FIG. 24G, kicking punt sequence 200G initiates a punt play. Steps 210 and 218 operate as described above. Step 244 prompts a user to select a type of punt, such as a pooch or a normal punt.

Step 246 is the punt interaction between the players where the kicking player is optionally provided with graphics and sound consistent with the selected type of punt and the returning player is optionally provided with graphics or sound consistent with defending a punt. The players initiate an interaction by, for example, a physical bump between two mobile phones or by selecting an option (e.g., click a button) that exchanges information about the punt play via any of the connection methods described above.

Step 248 models the rolling of three dice and the outcome from punt table 138 based on the combined total dice roll. Punt table 138 is depicted in FIG. 21 and consists of a table of outcomes versus dice roll totals. If the punt is fielded or blocked, the game progresses to defensive play sequence 200D for the kicking player and offensive play sequence 200E for the returning player. If the punt is fumbled, the game progresses to defensive play sequence 200D for the returning player and offensive play sequence 200E for the kicking player. If the punt is returned for a touchdown, the game progresses to kicking off sequence 200B for the returning player, who will now be kicking off, and to returning kick-off sequence 200C for the kicking player who will now be returning a kick-off.

Kicking Field Goal Sequence

As shown in FIG. 24H, kicking field-goal sequence 200H initiates a field-goal play. Steps 210 and 218 operate as described above.

Step 250 prompts a user to select a type of field-goal, such as a fake field-goal or a normal field-goal attempt. Steps 240 and 242 operate as described above.

Returning Punt Sequence

As shown in FIG. 24I, returning punt sequence 200I operates in tandem with kicking punt sequence 200G. Steps 210, 218, 246, and 248 operate as described above.

Other Preferred Embodiments

In another preferred embodiment of the invention, a unique set of defense cards 102 and a unique set of offense cards 104 are made specific to a particular amateur or professional sports team. In this embodiment, for each sports team's deck, play outcomes 116 are desirably based on that team's real-world statistics. Play outcomes 116 for all teams' decks can optionally be adjusted so that on average, each team's deck performs as well as any other deck. This optional adjustment may not be needed if the real-world statistics do not create a situation where some decks are significantly more successful than others. Moreover, defensive play indicator 118 and offensive play indicator 120 can reflect real-world sports teams' play names where each team's deck would contain real-world play names actually used by that team. Similarly, player package indicator 130 can provide player formations from real-world sports teams where each team's deck would contain real-world player formations actually used by that team. Extreme outcomes indicator 128 can also reflect best or worst case scenarios that have a given real-world sports team has experienced. Other card characteristics that can be customized for each sports team's deck based on real-world statistics include, for example, the following: defensive player positions 122, offensive player positions 124, play paths 108, alternate play paths 110, play lines 112, alternate play lines 114, play risk indicator 126, and unexpected play indicator 148.

In other preferred embodiments, card game 100 can be adapted for sports other than American football. For example, it is possible to modify defense cards 102 and offense cards 104 for games such as baseball, basketball, hockey, soccer, or rugby. In games such as basketball, hockey, or soccer, which are more continuous and free-flowing than football, play outcomes 116 can be adjusted to account for increased turnover events that represent the more frequent changes in possession. Additionally, play outcomes 116 can be adjusted to account for sport-specific outcomes. For example, an "off-side" outcome can be added to a hockey or soccer version; a "jump-ball" outcome can be added to a basketball version; and a "home run" can be added to a baseball version. The number, style, and positioning of defensive player positions 122 and offensive player positions 124 can be modified to account for sport-specific differences. For example, there would only be 5 players in a basketball version. Moreover, lanes 106, play paths 108, alternate play paths 110, play lines 112, and alternate play lines 114 can all be adjusted to account for sport-specific differences. For example, play paths 108 and play lines 112 can represent slugging while alternate play paths 110 and alternate play lines 114 can represent bunting in a baseball version. More or less play paths and lines can be used as needed depending on the sport. Similarly, more or less lanes 106 can be used to account for sport-specific differences. Additionally, it is contemplated that in a preferred embodiment, that defense cards 102 and offense cards 104 can be shapes other than rectangular and are capable of aligning on more than one edge. For example, it is possible that offense cards 104 be L-shaped while defense cards 102 are square or diamond-shaped such that a defense card 102 "fits" within the right angle of an L-shaped offense card 104, thereby causing the cards to align along two edges. This illustrative configuration could be used, for example, in a baseball version of card game 100 so that defensive player positions 122 could be more accurately represented on a diamond-shaped field. In situations where defense cards 102 and offense cards 104 align on more than one edge, it is possible that lanes 106 may be oriented in more than one dimension. For example, lanes 106 might be arranged in intersecting lanes that create a matrix. Game field board 142 and game progression markers can also be modified to represent a given sport's playing field.

Improvements Over Other Games

The present invention differs from and improves upon other sports card and board games. For instance, the present invention does not require the players to either shuffle or deal cards before playing. The invention also does not require traditional or conventional card game interactions, such as card values, "hands," "high" and "low" cards, or card retirement. The outcome of a play is determined by a single event—the combination of the offense and defense cards. This is in contrast to games that require a combination of cards, dice, coins, or reference tables to determine the outcome of one play. While the present invention relies on optional tables to determine optional kicking events, these tables are not required to determine the outcome of a standard (or non-kicking) play involving an offense and a defense card. Additionally, the solution of the play is represented graphically on the cards, and the play outcomes are also represented graphically on the cards. This allows for the result of the play to be determined immediately from the face of the cards after aligning any one given defense card 102 with any one given offense card 104.

The invention claimed is:

1. An apparatus for a sports card game, comprising:
   at least one offense card; and
   at least one defense card;
   wherein the number of offense cards is equal to the number of defense cards;
   wherein each offense card and each defense card contains a plurality of lanes;
   wherein each offense card contains a single play line positioned in a first lane;
   wherein each defense card contains a plurality of play paths equal to the number of lanes;
   wherein each defense card contains a play outcome for each play path;
   wherein each play path on a defense card is positioned in a separate lane;
   wherein the play line on an offense card corresponds to a single play path in a corresponding lane on a defense card; and
   wherein aligning an offense card with a defense card provides a play outcome determined by the play path in the lane on the defense card that corresponds to the lane containing the play line on the offense card.

2. The apparatus of claim 1 wherein the play line on said offense card can be of a first style or a second style.

3. The apparatus of claim 2 wherein each defense card contains two play paths for each lane.

4. The apparatus of claim 3 wherein one play path is of the first style and one play path is of the second style.

5. The apparatus of claim 4 wherein a play outcome is provided for each play path of the first style and each play path of the second style.

6. The apparatus of claim 1 wherein each offense card and each defense card contains player positions.

7. The apparatus of claim 1 wherein each offense card and each defense card contains a play risk indicator.

8. The apparatus of claim 1 wherein each offense card and each defense card contains a player package indicator.

9. The apparatus of claim 1 wherein each offense card and each defense card contains an extreme outcome indicator.

10. The apparatus of claim 1 wherein each offense card contains an offensive play type indicator.

11. The apparatus of claim 1 wherein each defense card contains a defensive play type indicator.

12. A method for playing an electronic sports card game, the method comprising the steps of:
    selecting an offense card;
    selecting a defense card; and
    determining a play outcome from an offensive play from the selected offense card and a defensive play from the selected defense card;
    wherein the offense card comprises one offensive play;
    wherein the defense card comprises a plurality of defensive plays; and
    wherein the offensive play corresponds to one of the defensive plays.

13. The method of claim 12 wherein each offense card and each defense card further comprises a player package indicator.

14. The method of claim 12 further comprising the steps of pre-selecting at least two offense cards; providing the player package indicator on the offense cards; and providing the player package indicator on the defense card before selecting an offense card.

15. The method of claim 12 wherein the game comprises at least one offense card and at least one defense card, wherein each offense card and each defense card contains a plurality of lanes, wherein each offense card contains a play line positioned in a first lane, wherein each defense card contains a number of play paths and a play outcome for each play path, wherein each play path on a defense card is positioned in a separate lane, and wherein the play line on an offense card corresponds to a play path in a corresponding lane on a defense card.

16. The method of claim 15 wherein each offense card and each defense card further comprises a player package indicator.

17. The method of claim 15 further comprising the steps of pre-selecting at least two offense cards; providing the player package indicator on the offense cards; and providing the player package indicator on the defense card before selecting an offense card.

18. A system for playing an electronic sports card game on multiple devices, the system comprising:
    at least two computing devices each having a display;
    a connection between each computing device;
    at least one electronic offense card;
    at least one electronic defense card;
    wherein each computing device controls either an offense or a defense at any given time;
    wherein the number of electronic offense cards is equal to the number of electronic defense cards;
    wherein each electronic offense card and each electronic defense card contains a plurality of lanes;
    wherein each electronic offense card contains a play line positioned in a first lane;
    wherein each electronic defense card contains a number of play paths equal to the number of lanes;
    wherein each electronic defense card contains a play outcome for each play path;
    wherein each play path on an electronic defense card is positioned in a separate lane;
    wherein the play line on an electronic offense card corresponds to a play path in the corresponding lane on an electronic defense card; and wherein the at least two computing devices determine and display a play outcome based on the play path in the lane on the defense card that corresponds to the lane containing the play line on the offense card.

* * * * *